(12) United States Patent
Nomura

(10) Patent No.: US 12,717,261 B2
(45) Date of Patent: Aug. 25, 2026

(54) DELIVERY MANAGEMENT SYSTEM, DELIVERY MANAGEMENT APPARATUS, AND IMAGE FORMING APPARATUS

(71) Applicant: Konica Minolta, Inc., Tokyo (JP)

(72) Inventor: Yoshitaka Nomura, Anjo (JP)

(73) Assignee: Konica Minolta, Inc., Tokyo (JP)

(*) Notice: Subject to any disclaimer, the term of this patent is extended or adjusted under 35 U.S.C. 154(b) by 0 days.

(21) Appl. No.: 18/929,901

(22) Filed: Oct. 29, 2024

(65) Prior Publication Data

US 2025/0138464 A1 May 1, 2025

(30) Foreign Application Priority Data

Oct. 31, 2023 (JP) ................................ 2023-186148

(51) Int. Cl.
*G03G 15/00* (2006.01)
*G06F 3/12* (2006.01)
(Continued)

(52) U.S. Cl.
CPC ....... *G03G 15/556* (2013.01); *G03G 15/5079* (2013.01); *G06F 3/1219* (2013.01);
(Continued)

(58) Field of Classification Search
CPC ............. G03G 15/556; G03G 15/5016; G03G 15/5075; G03G 15/5079;
(Continued)

(56) References Cited

U.S. PATENT DOCUMENTS

2006/0228123 A1* 10/2006 Zaima ................ G03G 15/5079 399/24
2012/0027424 A1* 2/2012 Kawai .................. G03G 15/556 399/27

(Continued)

FOREIGN PATENT DOCUMENTS

JP 2006-292830 A 10/2006
JP 7248949 B 3/2023
JP 2023-046234 A 4/2023

OTHER PUBLICATIONS

Extended European Search Report issued in corresponding European Application No. 24209096.7, dated Apr. 4, 2025 (10 pages).

*Primary Examiner* — Robert B Beatty
(74) *Attorney, Agent, or Firm* — Osha Bergman Watanabe & Burton LLP

(57) ABSTRACT

The delivery management apparatus is configured to acquire information on a consumption state of one or more consumables used in each of the one or more image forming apparatuses, determine a same timing of delivery of the one or more consumables to the one or more image forming apparatuses, based on the information, generate an adjustment setting for a consumption amount of the one or more consumables, for the each image forming apparatus, based on the same timing of delivery, and transmit, to the each image forming apparatus, the adjustment setting for the each image forming apparatus. The each image forming apparatus is configured to transmit the information to the delivery management apparatus, receive the adjustment setting, and perform the adjustment setting.

13 Claims, 23 Drawing Sheets

(51) Int. Cl.
*G06K 15/00* (2006.01)
*B41J 2/175* (2006.01)

(52) U.S. Cl.
CPC . *G06K 15/4075* (2013.01); *B41J 2002/17569* (2013.01); *B41J 2002/17589* (2013.01); *G03G 2215/00113* (2013.01); *G03G 2215/0875* (2013.01)

(58) Field of Classification Search
CPC .......... G03G 2215/00109; G03G 2215/00113; G03G 2215/0875; B41J 2002/17569; B41J 2002/17589; G06F 3/1219; G06K 15/4075; G06Q 10/0843; G06Q 10/08726; G06Q 10/08743
USPC ................................................. 399/8, 24, 43
See application file for complete search history.

(56) References Cited

U.S. PATENT DOCUMENTS

| | | | | |
|---|---|---|---|---|
| 2016/0286059 | A1* | 9/2016 | Hitaka | H04N 1/00068 |
| 2016/0292772 | A1* | 10/2016 | Nagasaki | G06Q 30/0633 |
| 2016/0350661 | A1* | 12/2016 | Sato | G06Q 10/087 |
| 2019/0287038 | A1* | 9/2019 | Ol | G03G 15/553 |
| 2019/0346801 | A1* | 11/2019 | Miyazawa | G06K 15/4075 |
| 2020/0041944 | A1* | 2/2020 | Hiraike | G03G 15/556 |
| 2022/0146973 | A1* | 5/2022 | Suzuki | G03G 15/5079 |
| 2023/0367238 | A1* | 11/2023 | Okubo | G03G 15/0856 |

* cited by examiner 160
170
IMAGE FORMING APPARATUS
DELIVERY CENTER
100
101
102
103
104
110
120
130
140
150

20
DELIVERY MANAGEMENT APPARATUS
200
202
ACQUIRER
204
TIMING DETERMINER
206
ADJUSTER
208
TRANSMITTER
IMAGE FORMING APPARATUS
250A
260A
COMMUNICATOR
270A
CONTROLLER
IMAGE FORMING APPARATUS
250B
260B
COMMUNICATOR
270B
CONTROLLER

| CONSUMABLE | ITEM FOR DETERMINING CONSUMPTION STATE OF CONSUMABLE | THRESHOLD VALUE | |
|---|---|---|---|
| TONER BOTTLE | REMAINING AMOUNT OF TONER IN TONER BOTTLE | 5g | 602 |
| IMAGE BEARING MEMBER | NUMBER OF ROTATIONS | 1000krot | 604 |
| | NUMBER OF PRINTED SHEETS | 200kp | |
| | REMAINING FILM THICKNESS | 15 μm | |
| DEVELOPER BEARING MEMBER | NUMBER OF ROTATIONS | 22000krot | 606 |
| | NUMBER OF PRINTED SHEETS | 1000kp | |
| INTERMEDIATE TRANSFER MEMBER | DRIVEN DISTANCE | 200km | 608 |
| | NUMBER OF PRINTED SHEETS | 300kp | |

| FOG MARGIN | COLOR | | | |
|---|---|---|---|---|
| | Y | M | C | K |
| DEFAULT | — | — | — | — |
| DEFAULT + 10V | 0.4mg/SHEET | 0.3mg/SHEET | 0.4mg/SHEET | 0.3mg/SHEET |
| DEFAULT + 20V | 0.8mg/SHEET | 0.6mg/SHEET | 0.8mg/SHEET | 0.6mg/SHEET |
| DEFAULT + 30V | 1.2mg/SHEET | 0.9mg/SHEET | 1.2mg/SHEET | 0.9mg/SHEET |

FIG.16

1600
TONER BOTTLE
SUB-HOPPER
1602
306
DEVELOPER BEARING MEMBER

| TONER CONCENTRATION | COLOR | | | |
|---|---|---|---|---|
| | Y | M | C | K |
| DEFAULT | 7.00% | 6.50% | 7.00% | 6.50% |
| UPPER LIMIT | 8.50% | 8.00% | 8.50% | 8.00% |
| LOWER LIMIT | 5.50% | 5.00% | 5.50% | 5.00% |

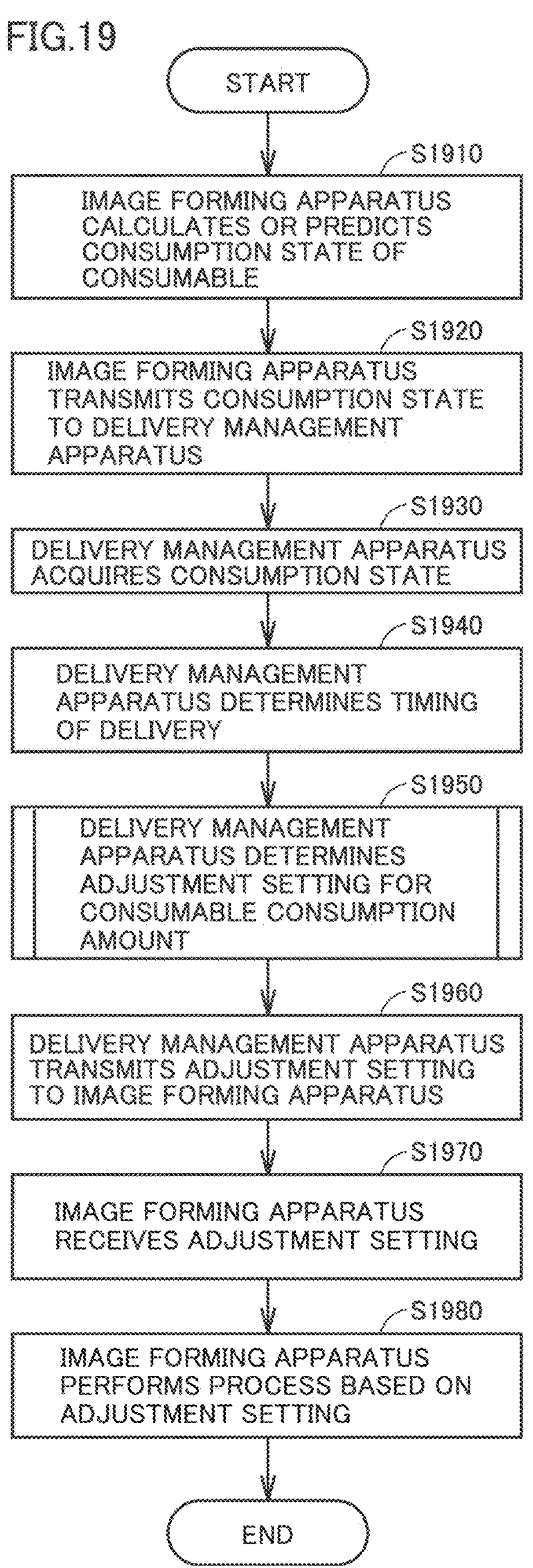
FIG.19
START
S1910
IMAGE FORMING APPARATUS CALCULATES OR PREDICTS CONSUMPTION STATE OF CONSUMABLE
S1920
IMAGE FORMING APPARATUS TRANSMITS CONSUMPTION STATE TO DELIVERY MANAGEMENT APPARATUS
S1930
DELIVERY MANAGEMENT APPARATUS ACQUIRES CONSUMPTION STATE
S1940
DELIVERY MANAGEMENT APPARATUS DETERMINES TIMING OF DELIVERY
S1950
DELIVERY MANAGEMENT APPARATUS DETERMINES ADJUSTMENT SETTING FOR CONSUMABLE CONSUMPTION AMOUNT
S1960
DELIVERY MANAGEMENT APPARATUS TRANSMITS ADJUSTMENT SETTING TO IMAGE FORMING APPARATUS
S1970
IMAGE FORMING APPARATUS RECEIVES ADJUSTMENT SETTING
S1980
IMAGE FORMING APPARATUS PERFORMS PROCESS BASED ON ADJUSTMENT SETTING
END

FIG.20

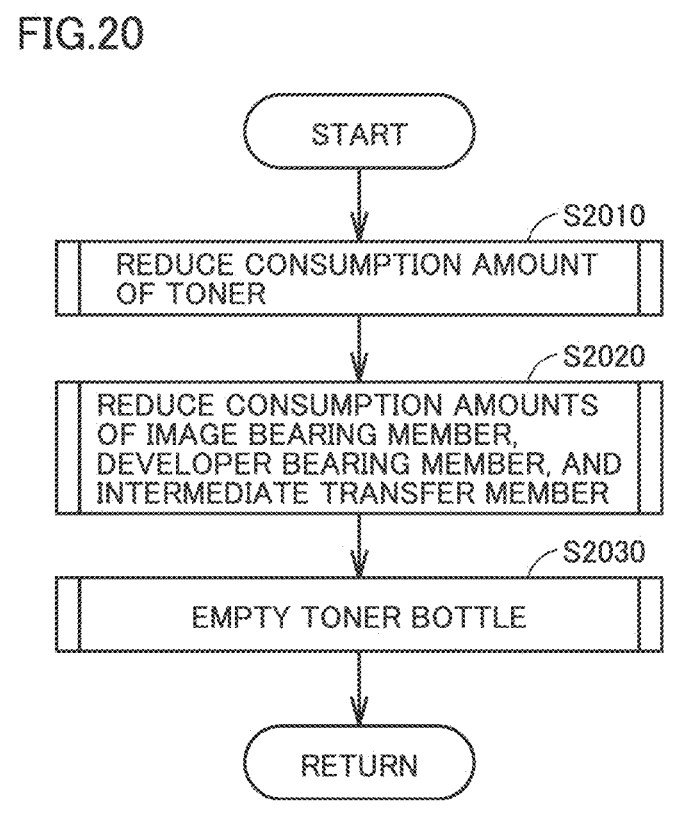

START

S2010 REDUCE CONSUMPTION AMOUNT OF TONER

S2020 REDUCE CONSUMPTION AMOUNTS OF IMAGE BEARING MEMBER, DEVELOPER BEARING MEMBER, AND INTERMEDIATE TRANSFER MEMBER

S2030 EMPTY TONER BOTTLE

RETURN

DELIVERY MANAGEMENT SYSTEM, DELIVERY MANAGEMENT APPARATUS, AND IMAGE FORMING APPARATUS

CROSS-REFERENCE TO RELATED APPLICATIONS

The entire disclosure of Japanese Patent Application No. 2023-186148, filed on Oct. 31, 2023, is incorporated herein by reference in its entirety.

BACKGROUND

Technological Field

The present disclosure relates to a delivery management system, and more specifically, to a technique for preventing shortage of a consumable.

Description of the Related Art

An image forming apparatus uses consumables such as a toner bottle and an image bearing member (or image carrier). The consumption states of these consumables are different for an image forming apparatus of each user. Therefore, conventionally, manufacturers of image forming apparatuses deliver consumables from a delivery center to a user based on a consumption state of consumables for an image forming apparatus of each user.

However, in recent years, there has been an increasing risk that consumables cannot be individually delivered to each user repeatedly, due to a labor shortage, frequent disasters, and the like. As a result, consumables cannot be delivered appropriately for each user, and a shortage of consumables (lack of consumables) may occur. In addition, if consumables are individually delivered to each user many times, an increase of the delivery cost is added to the price.

As a solution, it is conceivable to deliver a large amount of consumables to each user in advance. However, this method requires a place for storing consumables, which imposes a burden on the user. Therefore, there is a need for a technique for preventing shortage of consumables while keeping the delivery cost low.

Regarding a technique for preventing shortage of consumables, for example, Japanese Laid-Open Patent Publication No. 2023-046234 discloses a multifunction device capable of predicting an amount of available consumables mounted on the multifunction device, at the time consumables will arrive, and determining, depending on the result of the prediction, that maintenance saving should be performed for saving a maintenance process for the multifunction device ([Abstract]).

Another example of the technique for preventing shortage of consumables is disclosed in Japanese Laid-Open Patent Publication No. 2006-292830.

SUMMARY

To achieve at least one of the abovementioned objects, according to an aspect of the present invention, a delivery management system reflecting one aspect of the present invention includes one or more image forming apparatuses and a delivery management apparatus. The delivery management apparatus includes: a processor that: acquires information on a consumption state of one or more consumables used in each of the one or more image forming apparatuses, determines a same timing of delivery of the one or more consumables to the one or more image forming apparatuses, based on the information on the consumption state of the one or more consumables, generates an adjustment setting for a consumption amount of the one or more consumables, for each of the one or more image forming apparatuses, based on the same timing of delivery, and transmits, to each of the one or more image forming apparatuses, the adjustment setting for each of the one or more image forming apparatuses. Each of the one or more image forming apparatuses includes: a communication interface that transmits the information on the consumption state of the one or more consumables to the delivery management apparatus, and receives the adjustment setting; and a controller that performs the adjustment setting received from the delivery management apparatus.

To achieve at least one of the abovementioned objects, according to another aspect of the present invention, a delivery management apparatus reflecting another aspect of the present invention includes: an acquirer that acquires information on a consumption state of one or more consumables used in each of one or more image forming apparatuses; a timing determiner that determines a same timing of delivery of the one or more consumables to the one or more image forming apparatuses, based on the information on the consumption state of the one or more consumables; an adjuster that generates an adjustment setting for a consumption amount of the one or more consumables, for each of the one or more image forming apparatuses, based on the same timing of delivery; and a transmitter that transmits, to each of the one or more image forming apparatuses, the adjustment setting for each of the one or more image forming apparatuses.

To achieve at least one of the abovementioned objects, according to another aspect of the present invention, an image forming apparatus reflecting another aspect of the present invention includes: a communication interface that communicates with a delivery management apparatus; and a controller that adjusts a usage amount of one or more consumables. The communicator transmits information on a consumption state of the one or more consumables to the delivery management apparatus, and receives, from the delivery management apparatus, an adjustment setting for a consumption amount determined based on the same timing of delivery as that of one or more other image forming apparatuses. The controller adjusts the usage amount of the one or more consumables, based on the adjustment setting.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 6 is a diagram illustrating an example of a table 600 including threshold values for the image forming apparatus to perform a process of predicting progress of a consumption state of consumables.

FIG. 16 is a diagram illustrating an example of a relationship between a toner bottle, a sub-hopper, and a developer bearing member.

FIG. 17 is a diagram illustrating an example of the toner concentration of a developer bearing member.

FIG. 19 is a flowchart illustrating an example of the entire process procedure.

FIG. 20 is a flowchart illustrating an example of a process procedure in which a delivery management apparatus generates an adjustment setting for a consumption amount of a consumable.

DETAILED DESCRIPTION OF EMBODIMENTS

Figure 1:
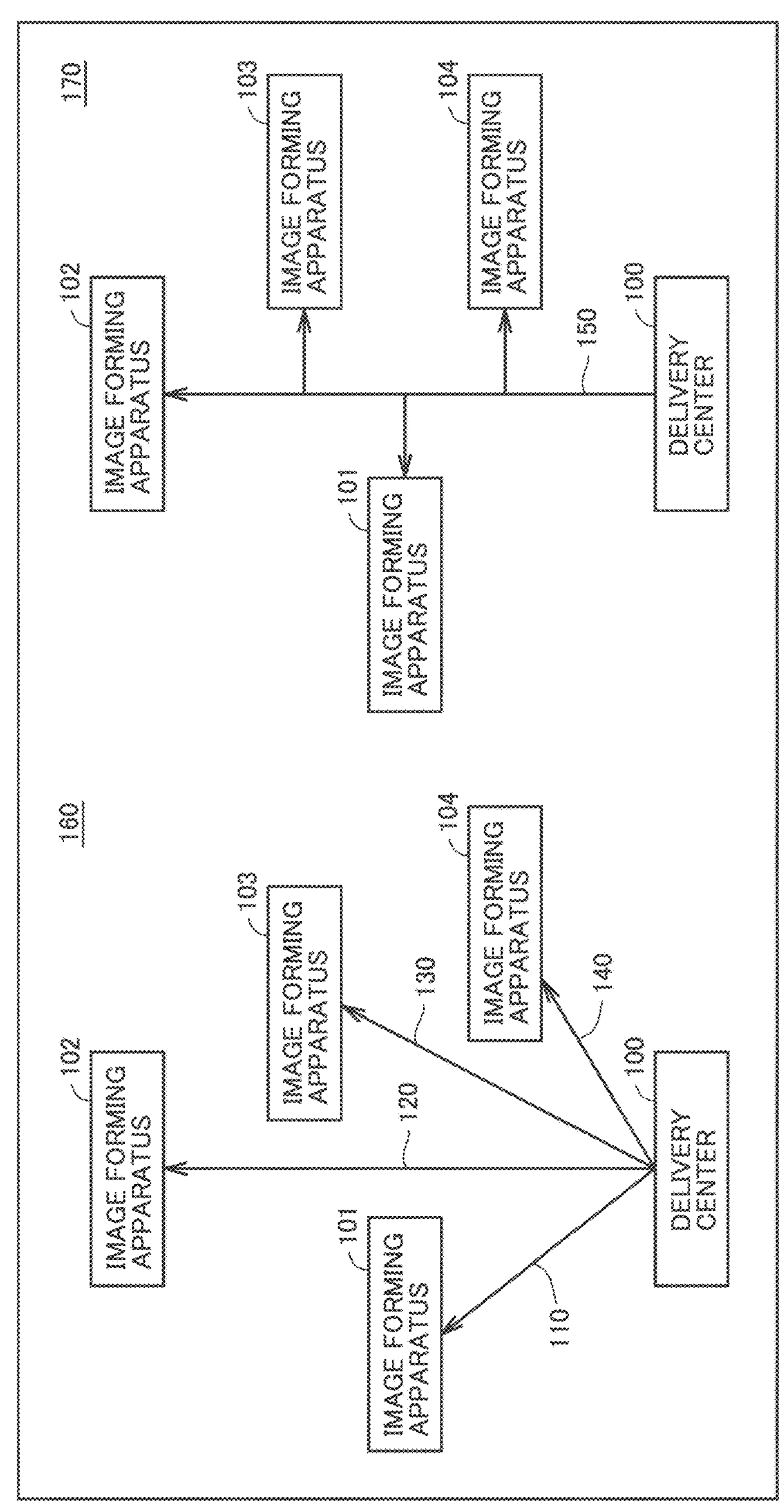
FIG. 1 is a diagram illustrating an overview of operation of a delivery management system according to the present embodiment.

Hereinafter, one or more embodiments of the present invention will be described with reference to the drawings. However, the scope of the invention is not limited to the disclosed embodiments.

Embodiments of a technical idea according to the present disclosure will be described hereinafter with reference to the drawings. In the following description, the same components are denoted by the same reference characters. Their names and functions are the same. Therefore, a detailed description thereof will not be repeated. Furthermore, each embodiment, each modification, each software configuration, each hardware configuration, each function, each process, and the like may be selectively combined as appropriate.

A. Overview of Delivery Management System

FIG. 1 is a diagram illustrating an overview of operation of a delivery management system 20 (see FIG. 2) according to the present embodiment. Referring to FIG. 1, a delivery method 170 by the delivery management system 20 will be described in comparison with a conventional delivery method 160.

An image forming apparatus owned by each user performs printing while consuming one or more consumables such as a toner bottle (toner), an image bearing member, a developer bearing member, and an intermediate transfer member. Therefore, the manufacturer of the image forming apparatus needs to periodically deliver these consumables to each user (each image forming apparatus). In a certain aspect, an owner (user) may be different for each of one or more image forming apparatuses. In another aspect, a user may possess a plurality of image forming apparatuses. In any case, the delivery management system 20 can manage identification information on one or more image forming apparatuses, and identification information, an address, and the like of a user of each image forming apparatus that are associated with each other.

First, the conventional delivery method 160 will be described. In the example of FIG. 1, consumables are delivered from a delivery center 100 to image forming apparatuses 101, 102, 103, and 104. In the conventional delivery method 160, a staff member of the delivery center 100 delivers consumables to the image forming apparatuses 101, 102, 103, and 104 at separate delivery timings 110, 120, 130, and 140. Therefore, in the conventional delivery method 160, when the number of image forming apparatuses to which consumables are to be delivered increases, individual delivery is required and the delivery cost increases significantly.

In contrast, in the delivery method 170 using the delivery management system 20, the delivery center 100 delivers consumables to the image forming apparatuses 101, 102, 103, and 104 all together at the same timing of delivery 150.

Thus, the delivery management system 20 can prevent shortage of consumables and can also reduce the delivery cost. Further, in the delivery method 170 using the delivery management system 20, even when the number of image forming apparatuses to which consumables are to be delivered increases, only the number of places to stop by per route increases, and an increase in the delivery cost is reduced comparatively.

As described above, one or more consumables include a toner bottle, an image bearing member, a developer bearing member, and an intermediate transfer member.

The timing of delivery 150 is a timing at which consumables are delivered all together to each of the image forming apparatuses 101, 102, 103, and 104. The timing of delivery 150 may include not only a time stamp of a point in time, but also any time for delivery, for example, one hour later, one day later, two weeks later, and one month later.

Next, an operation of the delivery management system 20 will be described. The delivery management system 20 includes a delivery management apparatus 200, an image forming apparatus 250A, and an image forming apparatus 250B (see FIG. 2). First, the delivery management apparatus 200 calculates or predicts information on the consumption state (or information on the remaining life) of one or more consumables, from each of one or more image forming apparatuses. The information on the consumption state of one or more consumables includes information on respective consumption amounts of the toner bottle, the image bearing member, the developer bearing member, and the intermediate transfer member. The information on the consumption amount of each toner bottle may be identified as information on the consumption amount of toner in the toner bottle.

The information on the consumption state of one or more consumables may also include respective remaining available amounts of the toner bottle, the image bearing member, the developer bearing member, and the intermediate transfer member. The information on the consumption state of one or more consumables may also include the usage amount per day of each of the toner bottle, the image bearing member, the developer bearing member, and the intermediate transfer member.

The usage amount per day of each consumable can be calculated from an average value for example of the number of sheets printed per day by the image forming apparatus. The information on the consumption state of a consumable may also include a cumulative usage amount of each consumable up to the present time. The information on the consumption state of one or more consumables may also include the number of sheets printed per day by each image forming apparatus. Further, the information on the consumption state of one or more consumables may include a predicted progress of the consumption state of the consumables.

Next, the delivery management apparatus 200 determines the timing of delivery 150 of consumables, based on the information on the consumption state of the consumables of each of one or more image forming apparatuses. In the example of FIG. 1, the delivery management apparatus 200 can determine, as the timing of delivery 150, a timing at which none of consumables of the image forming apparatuses 101 to 104 runs out. The timing at which none of consumables of the image forming apparatuses 101 to 104 runs out is a timing after an adjustment process as described next.

Next, the delivery management apparatus 200 generates an adjustment setting for each of one or more image forming apparatuses. In a certain aspect, the delivery management apparatus 200 may determine the timing of delivery 150 after generating the adjustment setting for each of one or more image forming apparatuses.

The adjustment setting is a setting for adjusting, based on prediction of the consumption amount of one or more consumables at the timing of delivery 150, the consumption amount of the consumables for preventing shortage of the consumables before the timing of delivery, or preventing the consumables from not being able to be replaced because the consumables are not used up even when the timing of delivery arrives. The adjustment setting is generated for each image forming apparatus.

Next, the delivery management apparatus 200 transmits, to each of one or more image forming apparatuses, the adjustment setting for the image forming apparatus. Each image forming apparatus adjusts the consumption amount of the consumables based on the adjustment setting. In one example, it is assumed that the image forming apparatus 101 has a greater toner consumption amount than the other image forming apparatuses. In this case, the adjustment setting for the image forming apparatus 101 includes a setting for reducing the consumption amount of toner.

In another example, it is assumed that the amount of wear of the image bearing member of the image forming apparatus 102 is greater than the other image forming apparatuses. In this case, the adjustment setting for the image forming apparatus 102 includes a setting for reducing the amount of wear of the image bearing member.

As described above, the delivery management apparatus 200 determines the timing of delivery 150 at which consumables are delivered at a time to all of one or more image forming apparatuses. Furthermore, the delivery management apparatus 200 generates an adjustment setting for each of one or more image forming apparatuses. Each of one or more image forming apparatuses receives the adjustment setting from the delivery management apparatus 200. Each of one or more image forming apparatuses adjusts the consumption amount of a part or all of one or more consumables, based on the adjustment setting.

Thus, each of one or more image forming apparatuses can prevent shortage of consumables until the timing of delivery 150. By providing the above-described functions, the delivery management system 20 can reduce the number of times consumables are delivered to one, while preventing shortage of consumables of each of one or more image forming apparatuses.

As described above, the user is different for each of one or more image forming apparatuses.

B. Configuration of Delivery Management System

Figure 2:
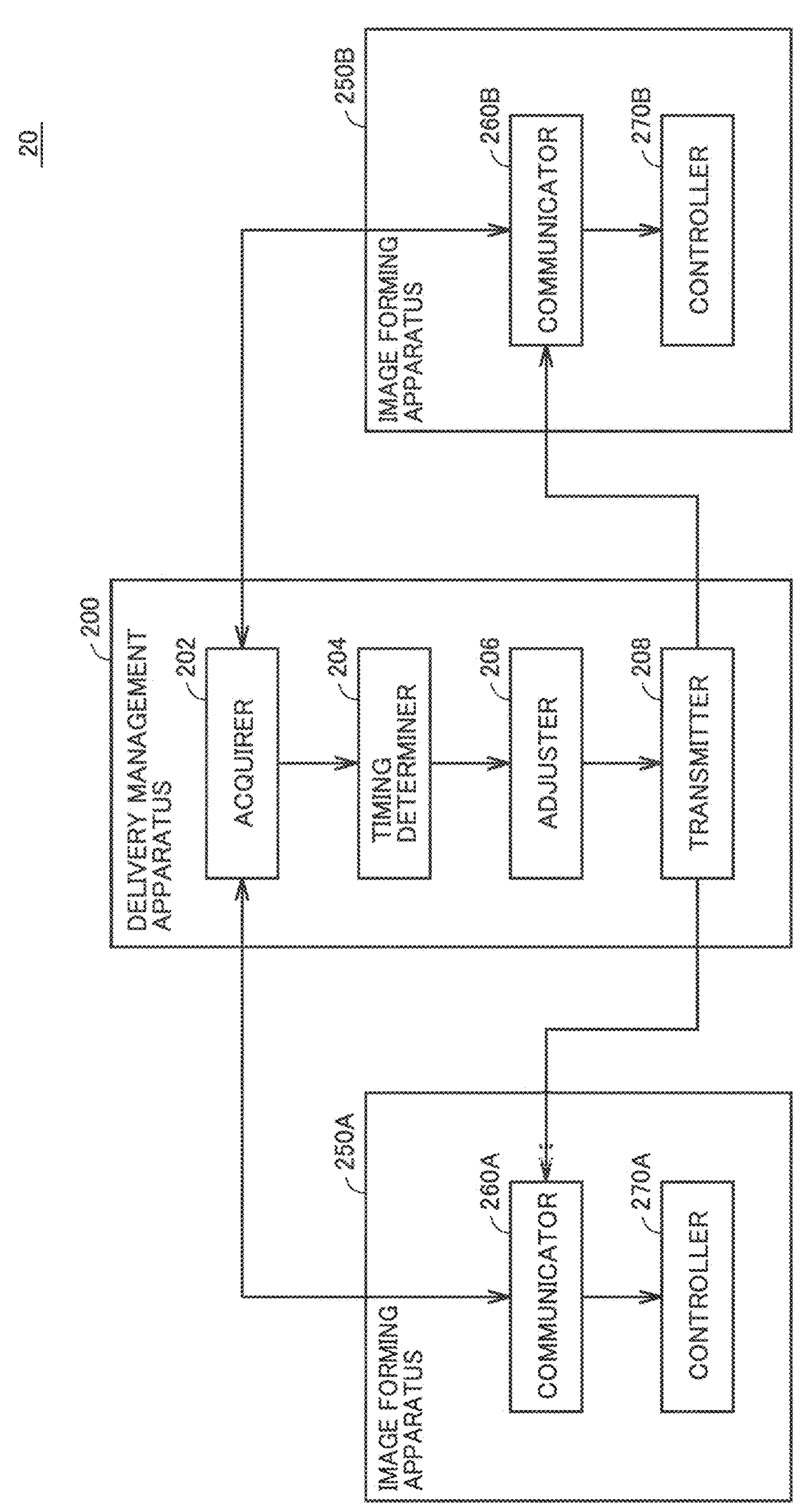
FIG. 2 is a diagram illustrating an example of a functional configuration of the delivery management system.

FIG. 2 is a diagram illustrating an example of a functional configuration of the delivery management system 20. The delivery management system 20 is a system for delivering consumables all together to one or more image forming apparatuses at the same timing of delivery.

The delivery management system 20 includes the delivery management apparatus 200 and one or more image forming apparatuses. In the example of FIG. 2, the delivery management system 20 includes image forming apparatuses 250A and 250B. However, this is merely an example. The delivery management system 20 may include one or any number of image forming apparatuses.

Hereinafter, one or more image forming apparatuses may be collectively referred to as image forming apparatus 250. Furthermore, the delivery management apparatus 200 and one or more image forming apparatuses that constitute the delivery management system 20 can be configured to be communicable with each other via the Internet.

The delivery management apparatus 200 includes an acquirer 202, a timing determiner 204, an adjuster 206, and a transmitter 208, part or all of which may be implemented by functions of a processor 501 described later. The image forming apparatus 250A includes a communicator (or communication interface) 260A and a controller 270A. Similarly, the image forming apparatus 250B includes a communicator (or communication interface) 260B and a controller 270B.

In a certain aspect, the image forming apparatus 250 may be a two-component-development color image forming apparatus implemented by the electrophotographic method. In another aspect, the image forming apparatus 250 may be an image forming apparatus configured to form a color image by the tandem method.

In a certain aspect, the delivery management apparatus 200 may be implemented by one or more personal computers, one or more servers, a virtual machine on a cloud environment, or a combination thereof. In one example, the delivery management apparatus 200 can be present in the delivery center 100. In another example, the delivery management apparatus 200 may be present outside the delivery center 100. Staff members of the delivery center 100 deliver consumables to users in accordance with a delivery schedule determined and output by the delivery management apparatus 200.

The communicators 260A and 260B transmit information on the consumption state of one or more consumables to the acquirer 202 of the delivery management apparatus 200. In one example, the communicators 260A and 260B may transmit the information on the consumption state of one or more consumables of the image forming apparatuses 250A and 250B to the acquirer 202 of the delivery management apparatus 200, at a fixed timing such as 10 o'clock every morning.

"Information on the consumption state of one or more consumables" herein refers to information on the remaining life of consumables such as toner, an image bearing member, a developer bearing member, and an intermediate transfer member. The remaining life of each consumable is calculated or predicted by each image forming apparatus 250, based on information such as the remaining amount of consumables, the number of rotations, the number of printed sheets, the remaining film thickness, and the driven distance.

In addition, the communicators 260A and 260B receive, from the transmitter 208, an adjustment setting determined by the adjuster 206, which will be described later, in order to adjust the usage amount of consumables of each image forming apparatus 250, based on the timing of delivery. The communicators 260A and 260B output the received adjustment setting to the controllers 270A and 270B, respectively. This process is performed after the information on the consumption state of consumables of each image forming apparatus 250 is transmitted to the delivery management apparatus 200 as described above, and thereafter the process of generating and transmitting the adjustment setting by the delivery management apparatus 200 is completed.

The controllers 270A and 270B execute a process of adjusting the consumption amount of one or more consumables, based on the adjustment setting acquired from the communicators 260A and 260B. More particularly, the controllers 270A and 270B adjust respective consumption amounts of consumables such as toner, the image bearing member, the developer bearing member, and the intermediate transfer member. For this purpose, the controllers 270A and 270B execute, in one example, a process of adjusting the consumption amount, such as reducing the amount of toner for printing, or reducing the number of times the density for printing is adjusted.

The acquirer 202 acquires information on the consumption state of one or more consumables, from each of the communicator 260A and the communicator 260B. That is, the acquirer 202 acquires information on the consumption state of one or more consumables from each of one or more image forming apparatuses.

More specifically, the acquirer 202 acquires information on the consumption state of consumables such as toner, an image bearing member, a developer bearing member, and an intermediate transfer member. In a certain aspect, the consumption state may represent a usage amount of each consumable. In another aspect, the consumption state may represent a remaining amount or a remaining life of each consumable.

The timing determiner 204 determines the timing of delivery of consumables, based on the information on the consumption state of the consumables of each of one or more image forming apparatuses 250 acquired from the acquirer 202. The timing of delivery is a timing of delivery at which consumables are delivered all together to one or more image forming apparatuses 250. That is, the consumables for each of one or more image forming apparatuses 250 are delivered at the same timing of delivery. In the example of FIG. 2, the consumables of the image forming apparatuses 250A and 250B are delivered at the same timing of delivery.

In a certain aspect, the timing determiner 204 can select, as the timing of delivery, a timing at which no shortage of all consumables of one or more image forming apparatuses 250 occurs. In addition, in another aspect, the timing determiner 204 may select, as the timing of delivery, the earliest timing at which a shortage of a consumable occurs, among all consumables of all image forming apparatuses 250.

Further, the timing determiner 204 may select, as the timing of delivery, a timing between the earliest timing at which a shortage of a consumable occurs among all consumables of all image forming apparatuses 250, and the latest timing at which a shortage of a consumable occurs, among the consumables.

Based on the timing of delivery acquired from the timing determiner 204, the adjuster 206 generates an adjustment setting for the consumption amount of the consumable. For example, in the case that the remaining amount of toner in the image forming apparatus 250A is small, the adjuster 206 incorporates, in the adjustment setting for the image forming apparatus 250A, a setting for reducing the amount of toner for printing.

Similarly, in the case that wear of the developer bearing member of the image forming apparatus 250B has increased, the adjuster 206 incorporates, in the adjustment setting for the image forming apparatus 250B, a setting for reducing the number of times the density for printing is adjusted. Thus, the adjuster 206 generates, for each of one or more image forming apparatuses, an adjustment setting suitable for the consumption state of each of one or more consumables. Therefore, details of the generated adjustment setting are different for each of one or more image forming apparatuses.

The transmitter 208 transmits the adjustment setting for the consumption amount of the consumable acquired from the adjuster 206, to each of a plurality of image forming apparatuses. In the example of FIG. 2, the transmitter 208 transmits an adjustment setting to each of the image forming apparatuses 250A and 250B.

As described above, the delivery management system 20 includes one or more image forming apparatuses 250A and 250B, and the delivery management apparatus 200. The delivery management apparatus 200 includes the acquirer 202 that calculates or predicts information on a consumption state of one or more consumables used in each of the one or more image forming apparatuses 250A and 250B, the timing determiner 204 that determines a same timing of delivery of one or more consumables to one or more image forming apparatuses 250, based on the information on the consumption state of one or more consumables, the adjuster 206 that generates an adjustment setting for a consumption amount of one or more consumables for each of one or more image forming apparatuses 250, based on the same timing of delivery, and the transmitter 208 that transmits the adjustment setting for each of one or more image forming apparatuses 250, to each of the plurality of image forming apparatuses 250. The one or more image forming apparatuses 250A and 250B respectively include the communicators 260A and 260B that transmit information on a consumption state of one or more consumables, to the delivery management apparatus, and receive adjustment settings, and the controllers 270A and 270B that perform the adjustment settings received from the delivery management apparatus 200.

As described above, the delivery management apparatus 200 includes the acquirer 202 that acquires information on a consumption state of one or more consumables used in each of one or more image forming apparatuses, the timing determiner 204 that determines the same timing of delivery of one or more consumables to one or more image forming apparatuses 250, based on the information on the consumption state of one or more consumables, the adjuster 206 that generates an adjustment setting for a consumption amount of one or more consumables, for each of one or more image forming apparatuses 250, based on the same timing of delivery, and the transmitter 208 that transmits the adjustment setting for each of one or more image forming apparatuses 250, to each of the plurality of image forming apparatuses 250.

Further, as described above, the image forming apparatuses 250A and 250B include the communicators 260A and 260B that communicate with the delivery management apparatus 200, and the controllers 270A and 270B that adjust the usage amount of one or more consumables. The communicators 260A and 260B transmit information on the consumption state of one or more consumables to the delivery management apparatus 200, and receive, from the delivery management apparatus 200, the adjustment setting for the consumption amount determined based on the same timing of delivery as that of one or more other image forming apparatuses 250. The controllers 270A and 270B adjust the usage amount of one or more consumables, based on the adjustment setting.

Figure 3:
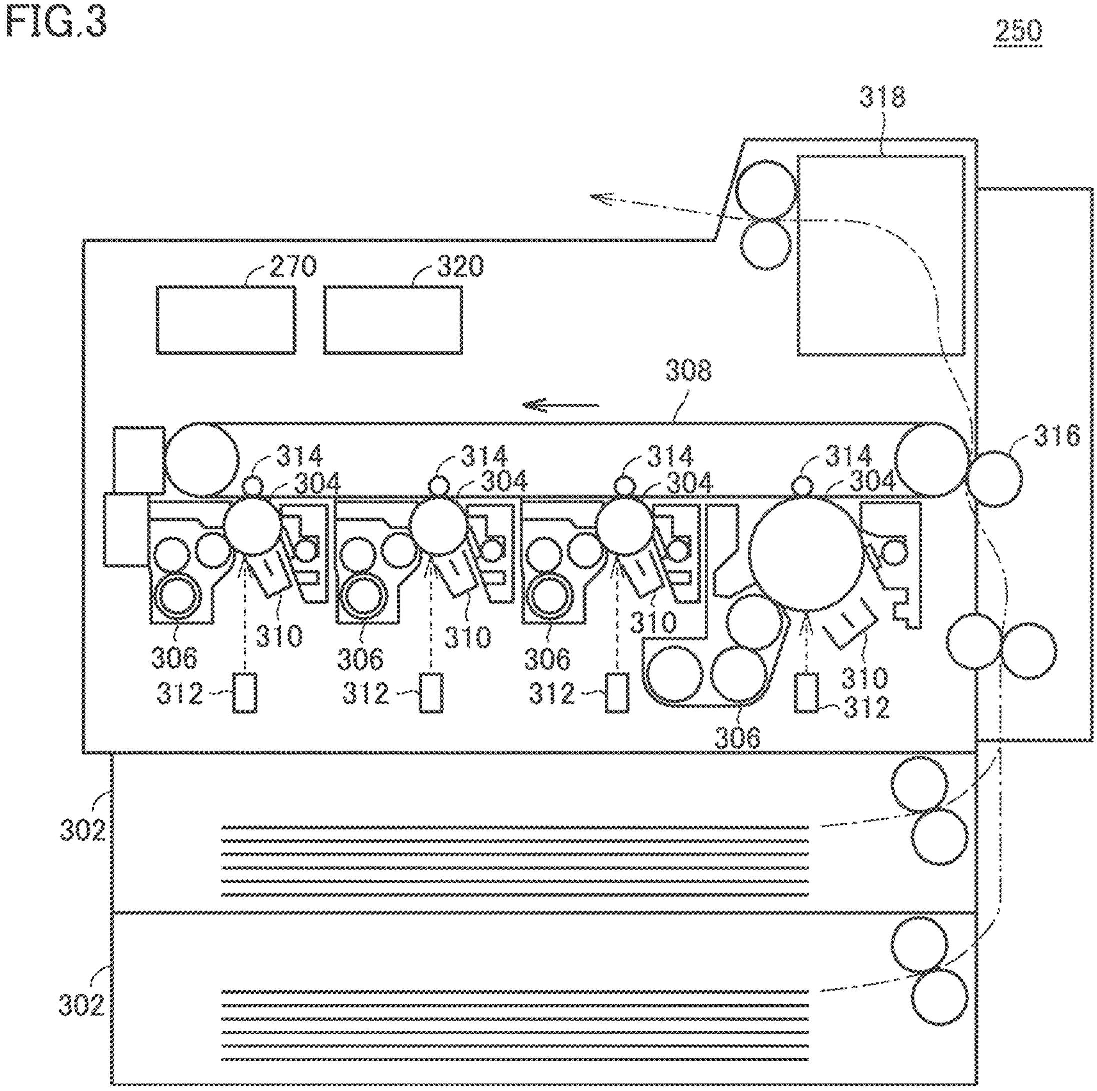
FIG. 3 is a diagram illustrating an example of a hardware configuration of an image forming apparatus.

FIG. 3 is a diagram illustrating an example of a hardware configuration of the image forming apparatus 250. The image forming apparatus 250 is any apparatus that prints an image on a medium using toner. The apparatus is, for example, a multifunction peripheral (MFP) or the like. Further, the image forming apparatus 250 may be configured to be able to print an image on any medium such as paper or resin.

The image forming apparatus 250 includes a toner bottle (not illustrated), a sheet feed section (or sheet feeding device) 302, an image bearing member (or image carrier) 304, a developer bearing member (or developer carrier) 306, an intermediate transfer member (or intermediate transfer body) 308, a charging section (or charger) 310, an exposure device 312, a primary transfer section (or primary transfer member) 314, a secondary transfer roller 316, a fixing section (or a fixing device) 318, an operation input unit (or operation input device) 320, and a controller 270. At least a part of these one or more members is configured to be replaceable.

Toner bottles are provided respectively for four colors, i.e., Y (yellow), M (magenta), C (cyan), and K (black), for example. Each toner bottle contains toner of each color. The toner bottle is rotated by a toner bottle motor serving as a drive source, to eject toner to the outside. Toner ejected from the toner bottle is supplied to a sub-hopper. In a certain aspect, the toner bottle may contain toner of a color other than YMCK.

The sheet feed section 302 stores a medium. The medium is conveyed from the sheet feed section 302 toward the secondary transfer roller 316 and the fixing section 318 through a conveyance path.

After being charged by the charging section 310, the image bearing member 304 is irradiated with laser light by the exposure device 312. Image bearing members 304 are provided respectively for four colors, i.e., Y (yellow), M (magenta), C (cyan), and K (black) in this order from the upstream side.

The charging section 310 electrically charges the image bearing member 304. In one example, the charging section 310 uniformly negatively charges the entire surface of the image bearing member 304.

The exposure device 312 exposes the image bearing member 304. More specifically, the exposure device 312 exposes the surface of the image bearing member 304. In the exposed portion, charges fall to the ground to form an electrostatic latent image.

The developer bearing member 306 supplies toner to the image bearing member 304. More specifically, the toner is placed on an electrostatic latent image formed on the image bearing member 304 by the action of an electric field force, so that a toner image is formed on the image bearing member 304. The toner image formed on the image bearing member 304 is transferred onto the intermediate transfer member 308 by the primary transfer section 314.

The primary transfer section 314 transfers the toner image formed on the image bearing member 304 onto the intermediate transfer member 308 by the action of an electric field force. The toner images in the respective colors of YMCK form a full-color toner image on the intermediate transfer member 308.

The intermediate transfer member 308 transfers the toner image formed on the intermediate transfer member 308 to the medium conveyed from the sheet feed section 302, by the action of an electric field force by the secondary transfer roller 316.

The secondary transfer roller 316 provides secondary transfer of toner onto the medium from the intermediate transfer member 308. More specifically, the secondary transfer roller 316 provides secondary transfer of the toner image formed on the intermediate transfer member 308 to the medium, by the action of an electric field force.

The fixing section 318 applies heat and pressure to the medium onto which the toner image has been transferred by the secondary transfer roller 316. Thus, the toner image is fixed to the medium. More specifically, the fixing section 318 includes two rollers, and one of the rollers includes a heat source therein. The heat source here is a fixing heater such as a halogen heater. The toner on the surface of the medium sandwiched between the two rollers is melted by the heat generated by the heat source. As the medium passes through the fixing section 318, the melted toner is solidified and fixed to the medium.

The operation input unit 320 receives, from a user of the image forming apparatus 250, an arbitrary operation input such as a print setting for the image forming apparatus 250 for a medium and an operation setting for the image forming apparatus 250. The operation input unit 320 outputs, to the controller 270, various settings input by the user of the image forming apparatus 250.

The controller 270 controls operation of the entire image forming apparatus 250. The controller 270 may include a processor 412 (see FIG. 4) that executes a control program 418 (see FIG. 4), a read only memory (ROM) (not illustrated) that stores the control program 418 and the like, and a random access memory (RAM) 414 (see FIG. 4) that constitutes a work area of the processor 412. Furthermore, the controller 270 may include a nonvolatile storage 416 (see FIG. 4).

As described above, one or more consumables include a toner bottle, an image bearing member, a developer bearing member, and an intermediate transfer member.

Figure 4:
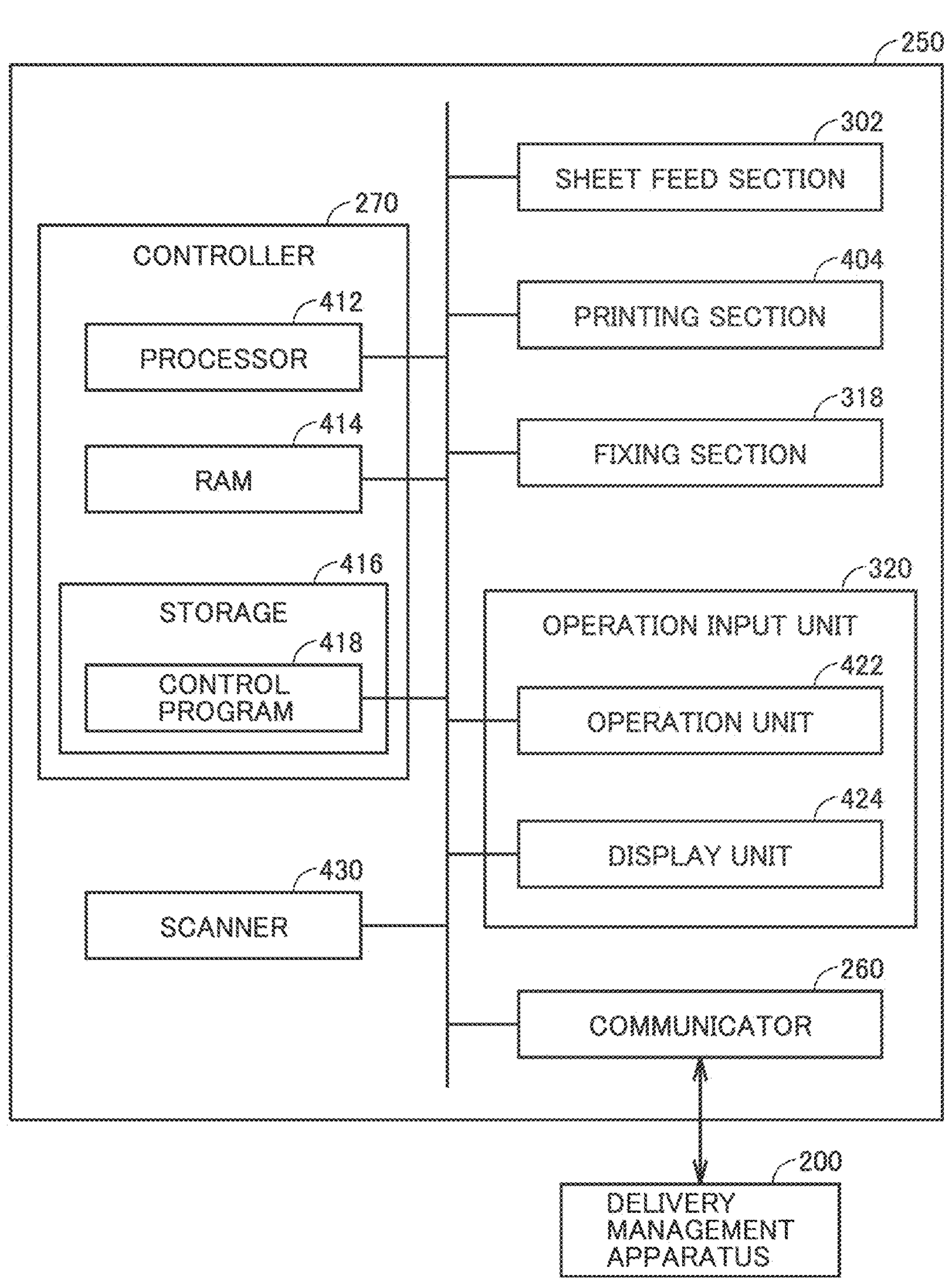
FIG. 4 is a diagram illustrating an example of a circuit configuration of the image forming apparatus.

FIG. 4 is a diagram illustrating an example of a circuit configuration of the image forming apparatus 250. The image forming apparatus 250 includes the sheet feed section 302, a printing section (or printing device) 404, the fixing section 318, the communicator 260, a scanner 430, the controller 270, and the operation input unit 320.

The sheet feed section 302 contains stacked media on which an image is to be formed. The sheet feed section 302 can be switched between an opened state in which a medium can be added from the outside of the image forming apparatus 250, and a closed state in which a medium cannot be added from the outside of the image forming apparatus 250. The image forming apparatus 250 may include a plurality of sheet feed sections 302. The media stacked in the sheet feed section 302 are each conveyed toward the downstream side of a conveyance path by a conveyance roller.

The printing section 404 forms a toner image on a medium conveyed by a registration roller. More specifically, the printing section 404 forms toner images of respective colors on photoreceptors for respective colors. The printing section 404 includes the image bearing member 304, the developer bearing member 306, the intermediate transfer member 308, the charging section 310, the exposure device 312, the primary transfer section 314, and the secondary transfer roller 316, which are involved in formation of a toner image. Furthermore, the printing section 404 may be a circuit that controls these components.

The communicator 260 can communicate with the delivery management apparatus 200 via the Internet or the like. The communicator 260 transmits, to the delivery management apparatus 200, information on the consumption state of a consumable used in each of the image forming apparatuses 250. The communicator 260 also receives, from the delivery management apparatus 200, an adjustment setting for the consumption state of the consumable of each image forming apparatus 250.

The scanner 430 includes an auto document feeder (ADF), an image sensor, and the like. The scanner 430 reads a document to acquire an image of the document.

The controller 270 controls the operation of the entire image forming apparatus 250. The controller 270 includes a processor 412, a RAM 414, and a storage 416. Furthermore, the storage 416 may include a control program 418.

The processor 412 performs adjustment setting for the consumption amount of a consumable of the image forming apparatus 250. In a certain aspect, the processor 412 is at least one central processing unit (CPU), at least one graphics processing unit (GPU), at least one field programmable gate array (FPGA), at least one application specific integrated circuit (ASIC), at least one artificial intelligence (AI), a chip, a combination thereof, or the like.

The RAM 414 forms a work area of the processor 412. The RAM 414 may be implemented by a dynamic random access memory (DRAM), a static random access memory (SRAM), or the like.

The storage 416 may be implemented by a hard disk drive (HDD), a solid state drive (SSD), an erasable programmable read only memory (EPROM), an electrically erasable programmable read only memory (EEPROM), a flash memory, or the like.

The operation input unit 320 includes an operation unit (or operation device) 422 and a display unit (or display device) 424. The operation unit 422 includes a plurality of buttons and can receive an input from a user, similarly to the touch screen. In a certain aspect, the operation unit 422 may include a touch sensor overlaid on the display unit 424.

The display unit 424 may be a liquid crystal monitor, an organic electro luminescence (EL) monitor, or the like. The liquid crystal monitor, the organic EL monitor, and the like can each include a touch sensor to display an operation menu and to receive a user's touch input.

Figure 5:
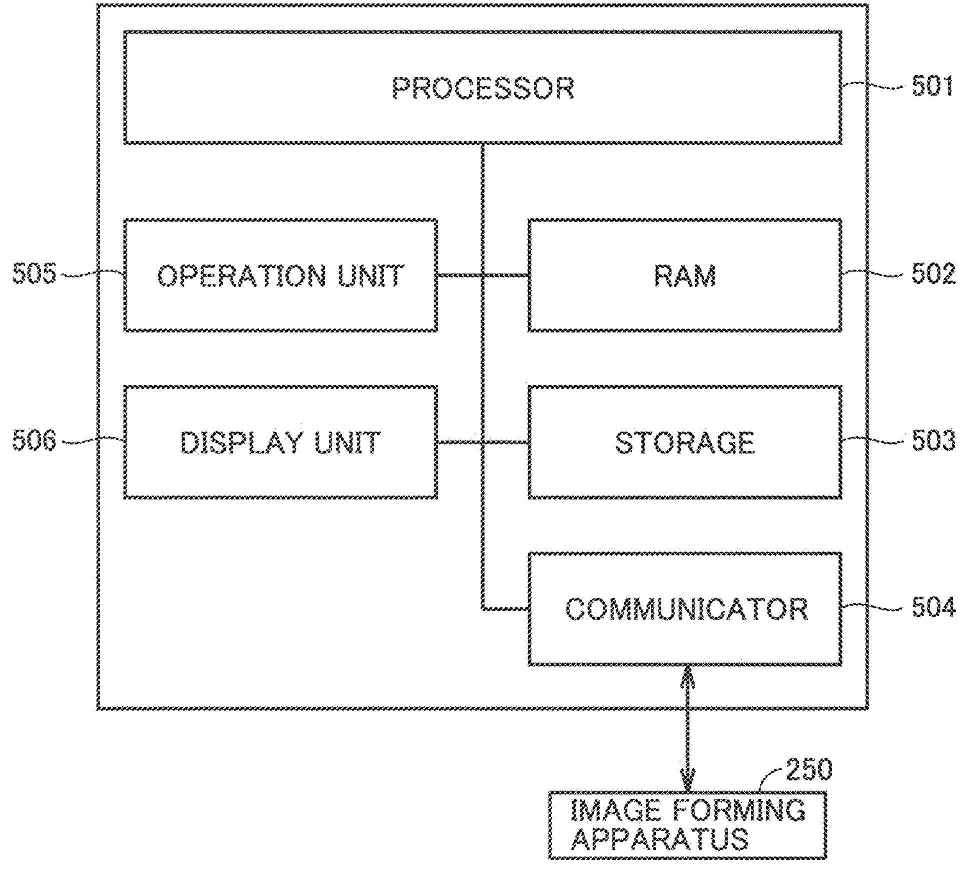
FIG. 5 is a diagram illustrating an example of a hardware configuration of a delivery management apparatus.

FIG. 5 is a diagram illustrating an example of a hardware configuration of the delivery management apparatus 200. The delivery management apparatus 200 includes the processor 501, a RAM 502, a storage 503, a communicator (or communication interface) 504, an operation unit 505 (or operation device), and a display unit (or display device) 506.

The processor 501 determines the same timing of delivery of consumables to all the image forming apparatuses 250, based on the information on the consumption state of consumables of each image forming apparatus 250. In addition, the processor 501 generates an adjustment setting for the consumption amount of consumables of each image forming apparatus 250, based on the timing of delivery.

In a certain aspect, similarly to the processor 412, the processor 501 may include at least one CPU, at least one GPU, at least one FPGA, at least one ASIC, at least one AI chip, a combination thereof, or the like.

Similarly to the RAM 414, the RAM 502 forms a work area of the processor 412. The RAM 502 may be implemented by a DRAM, an SRAM, or the like.

Similarly to the storage 416, the storage 503 may be implemented by an HDD, an SSD, an EPROM, an EEPROM, a flash memory, or the like.

The communicator 504 can communicate with the image forming apparatus 250 via the Internet or the like. The communicator 504 receives, from the image forming apparatuses 250, information on a consumption state of a consumable used in each of the image forming apparatuses 250. In addition, the communicator 504 transmits, to the image forming apparatus 250, an adjustment setting for the consumption state of the consumable of each image forming apparatus 250.

The operation unit 505 is any input device such as keyboard, mouse, or touch screen, and can receive an input from a user. In a certain aspect, the operation unit 505 may include a touch sensor overlaid on the display unit 506. In another aspect, the operation unit 505 may be an interface for connecting any input device.

The display unit 506 may be any output device such as liquid crystal monitor or organic electro luminescence (EL) monitor. In a certain aspect, the liquid crystal monitor, the organic EL monitor, or the like includes a touch sensor, and can display an operation menu and receive an input by a user's touch. In another aspect, the operation unit 505 may be an interface for connecting an any output device.

C. Method for Generating Adjustment Setting

FIG. 6 is a diagram illustrating an example of a table 600 including threshold values for the image forming apparatus 250 to perform a process of predicting progress of a consumption state of consumables. The table 600 shows the threshold value of the life of each of one or more consumables used by the image forming apparatus 250.

In one example, the table 600 includes a threshold value 602, a threshold value 604, a threshold value 606, and a threshold value 608. The threshold value 602 is a threshold value of the life of the toner bottle. The threshold value 604 is a threshold value of the life of the image bearing member. The threshold value 606 is a threshold value of the life of the developer bearing member 306. The threshold value 608 is a threshold value of the life of the intermediate transfer member. The numerical values of the threshold values illustrated in FIG. 6 are merely examples. Each threshold value in the table 600 may be set to any value.

The image forming apparatus 250 predicts the progress of the consumption state of each consumable, based on the current consumption state of each consumable, the table 600 illustrating the threshold value of the life of each consumable, and past cumulative data of the consumption state of each consumable.

First, the image forming apparatus 250 measures the current consumption state of each consumable with various sensors. The consumption state refers to, for example, the remaining amount of toner in the toner bottle, the number of rotations of the image bearing member 304, the number of rotations of the developer bearing member 306, and the driven distance of the intermediate transfer member 308.

Next, the image forming apparatus 250 compares respective current consumption states of various consumables measured by various sensors, with respective threshold values 602, 604, 606, and 608 in the table 600, to thereby obtain the amount of available remaining consumables. In one example, the image forming apparatus 250 calculates or predicts the consumption state (the remaining amount of toner) of the toner bottle based on a signal from a rotation sensor or the like.

Next, the image forming apparatus 250 compares the consumption state (the remaining amount of toner) of the toner bottle with the threshold value 602 of the toner bottle in the table 600. Thus, the image forming apparatus 250 obtains the remaining amount of available toner in the toner bottle (consumable).

Furthermore, the image forming apparatus 250 obtains the average daily usage amount of various consumables based on past cumulative data of the image forming apparatus 250. The past cumulative data is, for example, the average daily usage amount of consumables, which is determined based on past cumulative data of the usage amount of consumables in one day.

The image forming apparatus 250 can predict the progress of the consumption state of each of various consumables, by dividing the remaining available amount of the consumable by the average daily usage amount of the consumable. The prediction of the progress of the consumption state of each consumable indicates the number of remaining days until the end of life of the consumable, or the number of remaining days for which the consumable can be used. That is, prediction of the progress of the consumption state of the consumable may be identified as prediction of the life of the consumable or the consumption state of the consumable.

A procedure for the image forming apparatus 250 to predict the progress of the consumption state of each consumable will be described with reference to the table 600. The threshold value 602 of the life of toner in the table 600 indicates that the toner bottle needs to be replaced while the remaining amount of toner in the toner bottle is larger than 5 g.

Regarding the threshold value 602 as an example, a method of calculating the remaining life of the toner bottle will be described. It is assumed that the current remaining amount in the toner bottle of the image forming apparatus 250 is 405 g. The image forming apparatus 250 compares the current remaining amount 405 g with the threshold value 602 (5 g). As a result, the image forming apparatus 250 determines that the remaining available toner is 400 g. Further, it is assumed that the image forming apparatus 250 determines that the average daily consumption is 10 g based on past cumulative data of the toner bottle.

In this case, the image forming apparatus 250 can predict that the remaining life of toner is 40 days (400 g/10 g=40 days). Specifically, the controller 270 of the image forming apparatus 250 can predict the progress of the consumption state of the toner bottle, based on the current consumption state of the toner bottle, the threshold value 602, and the past cumulative data of the toner bottle.

The threshold value 604 of the life of the image bearing member 304 in the table 600 indicates that the image bearing member 304 needs to be replaced while the number of rotations of the image bearing member 304 is less than 1000 krot (kilo rotations). Similarly, the threshold value 604 of the life of the image bearing member 304 indicates that the image bearing member 304 needs to be replaced while the number of printed sheets is less than 200 kp (kilopage) (i.e., 200000 pages). Similarly, the threshold value 604 of the life of the image bearing member 304 indicates that the image bearing member 304 needs to be replaced while the remaining film thickness of the image bearing member 304 is greater than 15 μm.

Regarding the threshold value 604 as an example, a method of calculating the remaining life of the image bearing member 304 will be described. It is assumed that the current number of rotations of the image bearing member 304 of the image forming apparatus 250 is 600 krot. The image forming apparatus 250 compares the current number of rotations 600 krot with the threshold value 604. As a result, the image forming apparatus 250 determines that the remaining 400 krot of the image bearing member 304 is available.

Further, it is assumed that the image forming apparatus 250 determines that 10 krot of the image bearing member 304 is consumed in one day on the average. In this case, the image forming apparatus 250 can predict that the remaining life of the image bearing member 304 is 40 days (400 krot/10 krot=40 days).

Specifically, the controller 270 of the image forming apparatus 250 can predict the progress of the consumption state of the image bearing member 304, based on the current consumption state of the image bearing member 304, the threshold value 604, and the past cumulative data of the image bearing member 304.

In a certain aspect, the image forming apparatus 250 may predict the progress of the consumption state of the image bearing member 304, by using the number of printed sheets instead of the number of rotations. In this case, the image forming apparatus 250 can predict the progress of the consumption state of the image bearing member 304, based on the current number of printed sheets, the threshold value of the number of printed sheets, and the past cumulative data of the number of printed sheets.

In another aspect, the image forming apparatus 250 may predict the progress of the consumption state of the image bearing member 304, by using the number of printed sheets or the remaining film thickness of the image bearing member 304, instead of the number of rotations. In this case, the image forming apparatus 250 can predict the progress of the consumption state of the image bearing member 304, based on the current remaining film thickness of the image bearing member 304, the threshold value of the remaining film thickness, and the past cumulative data of the remaining film thickness. The remaining film pressure of the image bearing member 304 can be estimated based on the electrical resistance or the like of the image bearing member 304.

The threshold value 606 of the life of the developer bearing member 306 in the table 600 indicates that the developer bearing member 306 needs to be replaced while the number of rotations of the developer bearing member 306 is less than the 22000 krot. Similarly, the threshold value 606 of the developer bearing member 306 indicates that the developer bearing member 306 needs to be replaced while the number of printed sheets is less than the 1000 kp.

Regarding the threshold value 606 as an example, a method of calculating the remaining life of the developer bearing member 306 will be described. It is assumed that the current number of rotations of the developer bearing member 306 of the image forming apparatus 250 is 2000 krot. The image forming apparatus 250 compares the current number of rotations 2000 krot with the threshold value 606.

As a result, the image forming apparatus 250 determines that the remaining 20000 krot of the developer bearing member 306 is available. Further, it is assumed that the image forming apparatus 250 determines that 1000 krot of the developer bearing member 306 is consumed in one day on the average. In this case, the image forming apparatus 250 can calculate or predict that the remaining life of the developer bearing member 306 is 20 days (20000 krot/1000 krot=20 days).

Specifically, the controller 270 of the image forming apparatus 250 can predict the progress of the consumption state of the developer bearing member 306, based on the current consumption state of the developer bearing member 306, the threshold value 606, and the past cumulative data of the developer bearing member 306.

In a certain aspect, the image forming apparatus 250 may predict the progress of the consumption state of the developer bearing member 306, by using the number of printed sheets instead of the number of rotations. In this case, the image forming apparatus 250 can predict the progress of the consumption state of the developer bearing member 306, based on the current number of printed sheets, the threshold value of the number of printed sheets, and the past cumulative data of the number of printed sheets.

The threshold value 608 of the life of the intermediate transfer member 308 in the table 600 indicate that the intermediate transfer member needs to be replaced while the driven distance of the intermediate transfer member 308 is less than the 200 km. Similarly, the threshold value 608 of the life of the intermediate transfer member 308 indicates that the intermediate transfer member 308 needs to be replaced while the number of printed sheets of the intermediate transfer member 308 is less than 300 kp.

Regarding the threshold value 608 as an example, a method of calculating the remaining life of the intermediate transfer member 308 will be described. It is assumed that the current driven distance of the intermediate transfer member 308 of the image forming apparatus 250 is 10 km. The image forming apparatus 250 compares the current driven distance 10 km with the threshold value 608.

As a result, the image forming apparatus 250 determines that the intermediate transfer member 308 is available in the remaining driven distance of 190 km. Further, it is assumed that the image forming apparatus 250 determines that 5 km is consumed in one day on the average, based on the past cumulative data of the intermediate transfer member 308. In this case, the image forming apparatus 250 can calculate or predict that the remaining life of the intermediate transfer member 308 is 38 days (190 km/5 km=38 days).

Specifically, the controller 270 of the image forming apparatus 250 can predict the progress of the consumption state of the intermediate transfer member 308, based on the current consumption state of the intermediate transfer member 308, the threshold value 608, and the past cumulative data of the intermediate transfer member 308.

In a certain aspect, the image forming apparatus 250 may predict the progress of the consumption state of the intermediate transfer member 308, by using the number of printed sheets instead of the driven distance. In this case, the image forming apparatus 250 can predict the progress of the consumption state of the intermediate transfer member 308, based on the current number of printed sheets, the threshold value of the number of printed sheets, and the past cumulative data of the number of printed sheets.

Each image forming apparatus 250 uses the table 600 to predict the progress of the consumption state of each of various consumables, that is, shortage of which consumable will occur in what length of period. Then, each image forming apparatus 250 transmits information on the consumption state of various consumables (information on progress prediction) to the delivery management apparatus 200. Thus, the delivery management apparatus 200 can determine the timing of delivery of the same consumable to each image forming apparatus.

As described above, the image forming apparatus 250 calculates or predicts the consumption state of one or more consumables, from at least one of the consumption amount of toner for print information, the remaining amount of toner in the toner bottle, the number of printed sheets, the number of rotations of the image bearing member 304, the remaining film thickness of the image bearing member 304, the number of rotations of the developer bearing member 306, and the driven distance of the intermediate transfer member 308.

Figure 7:
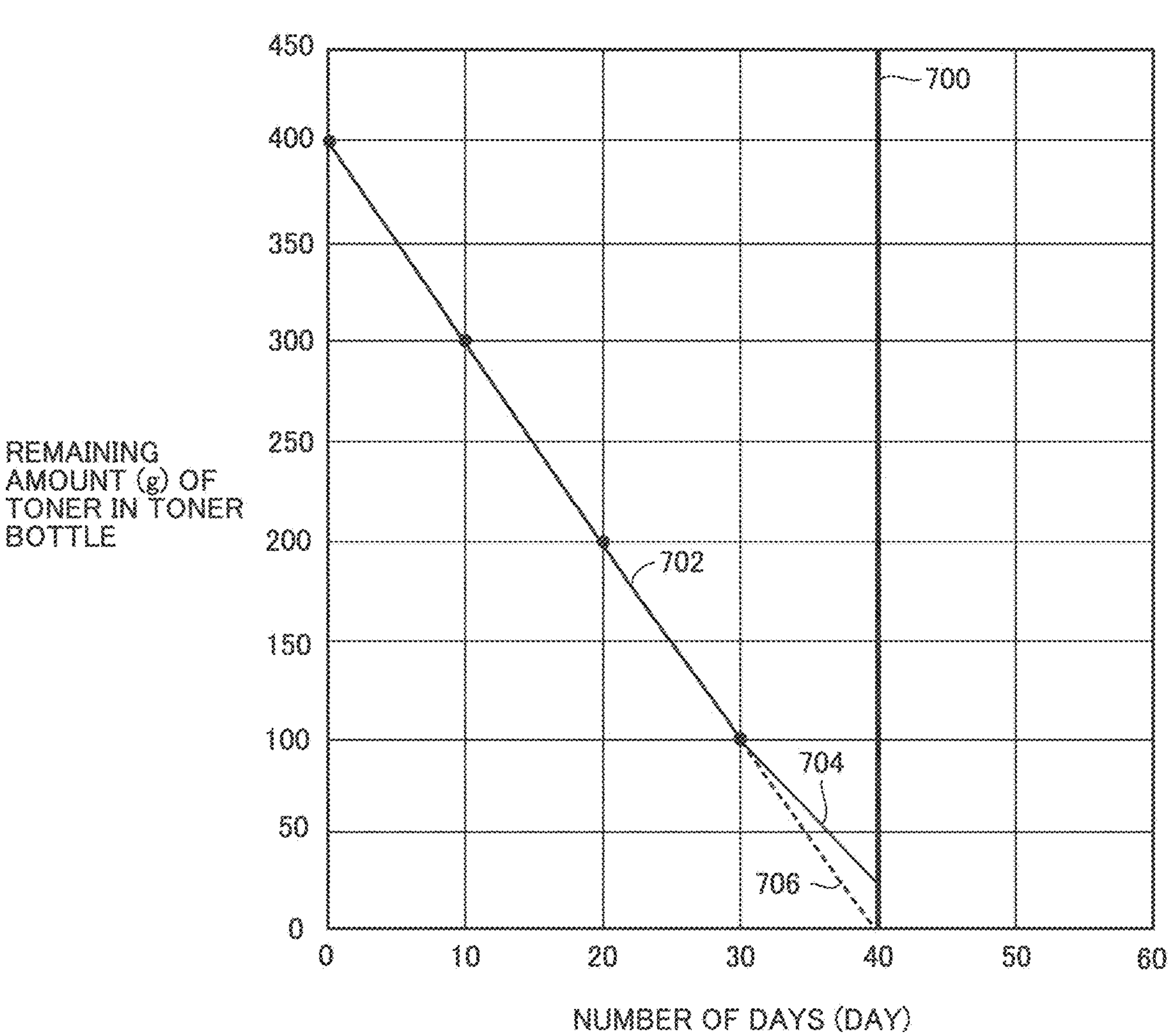
FIG. 7 is a diagram illustrating an example of a process of reducing consumption of toner in a toner bottle.

FIG. 7 is a diagram illustrating an example of a process of reducing consumption of toner in a toner bottle. As described above, the delivery management apparatus 200 acquires the consumption state (prediction of progress of the consumption state) of each of one or more consumables, from each of one or more image forming apparatuses 250. Next, the delivery management apparatus 200 determines the same timing of delivery of the one or more consumables to the one or more image forming apparatuses, based on the acquired information on the consumption state of the one or more consumables.

Furthermore, the delivery management apparatus 200 generates, for each of one or more image forming apparatuses, an adjustment setting for the consumption amount of one or more consumables, based on the determined timing of delivery, and transmits the adjustment setting to each image forming apparatus 250. Each image forming apparatus 250 adjusts the consumption amount of the consumable, based on the received adjustment setting.

In one example, an adjustment process for reducing consumption of toner in a toner bottle of an image forming apparatus A, which is one of the image forming apparatuses 250, will be described. FIG. 7 shows a graph 702, a graph 704, a graph 706, and a timing of delivery 700. In the example of FIG. 7, the delivery management apparatus 200 determines that the timing of delivery 700 is 40 days from the present time.

The graph 702 is a graph indicating the predicted progress of the consumption amount of toner in the toner bottle, from 0 day (present) to 30 days from the present time, in the image forming apparatus A. The graph 706 is a continuation from the graph 702. The graph 706 is a graph indicating the predicted progress of the consumption amount of toner in the toner bottle, from 30 days to 40 days in the image forming apparatus A, in the case where the consumption amount of the toner is not adjusted. The graph 704 is a continuation from the graph 702. The graph 704 is a graph indicating the predicted progress of the consumption amount of the toner in the toner bottle, from 30 days to 40 days in the image forming apparatus A, in the case where the consumption amount of the toner is adjusted.

Here, it is assumed that the image forming apparatus A continues using the toner bottle without performing the adjustment setting for the consumption amount of the toner in the toner bottle. In this case, as can be seen from the graph 706, a shortage of the toner will occur in the toner bottle in the image forming apparatus A, before the timing of delivery 700.

The delivery management apparatus 200 receives, from the image forming apparatus A, information on the consumption state (or information on the remaining life) of one or more consumables. Then, the delivery management apparatus 200 detects, from the information on the consumption state of one or more consumables, that a shortage of the toner will occur in the image forming apparatus A, before the timing of delivery 700.

Then, the delivery management apparatus 200 generates an adjustment setting for the image forming apparatus A including a setting for adjusting the consumption amount of toner. Next, the delivery management apparatus 200 transmits the adjustment setting for the image forming apparatus A to the image forming apparatus A.

The image forming apparatus A adjusts the consumption amount of toner based on the received adjustment setting. Information such as the adjustment amount and the adjustment start timing of the toner is included in the adjustment setting. In one example, when 10 days remain to the timing of delivery 700, the image forming apparatus A adjusts the consumption amount of toner in the toner bottle, based on the adjustment setting. Thus, the image forming apparatus A can prevent a shortage of toner in the toner bottle, before the timing of delivery 700.

In another example, the image forming apparatus A may adjust the toner consumption amount immediately after receiving the adjustment setting (on day 0). In a certain aspect, the remaining amount of toner in the toner bottle, the progress prediction of the consumption amount of toner in the toner bottle, and the like may be calculated for each color toner.

It is assumed that the current (on day 0) amount of toner remaining in the toner bottle of the image forming apparatus A is 400 g. At this time, the remaining available amount of toner in the toner bottle is 395 g (current remaining amount (400 g)−threshold value 602 (5 g)). Further, it is assumed that 10 g of toner is consumed in one day on the average. In this case, the usage amount of toner in 40 days is 400 g (10 g×40 days=400 g), which exceeds the remaining available amount (395 g). Therefore, 40 days later, which is the timing of delivery 700, a shortage of toner in the toner bottle occurs. Therefore, the image forming apparatus A needs to adjust the toner consumption amount so that toner equal to or more than the threshold value 602 (5 g) remains before the timing of delivery 700.

In one example, when it is 10 days (30th day) to the timing of delivery 700, the image forming apparatus A adjusts to reduce the consumption amount of the toner in the toner bottle. In the case where the image forming apparatus A has used 10 g, per day, of toner in the toner bottle for 30 days, 100 g of toner remains on the 30th day (10 g×30 days=300 g, 400 g−300 g=100 g). The amount of toner available for the remaining 10 days is 95 g (remaining amount 100 g-−threshold value 602 (5 g)).

Therefore, the delivery management apparatus 200 incorporates, in the adjustment setting for the image forming apparatus A, a setting for reducing the consumption amount of the toner in the toner bottle so that the daily consumption amount for the remaining 10 days is 9 g (95 g÷10 days=9 g/day) or less. The image forming apparatus A can reduce consumption of the toner in the toner bottle based on the adjustment setting, to prevent a shortage of toner in the toner bottle, before the determined same timing of delivery.

In a certain aspect, the image forming apparatus A may adjust the consumption amount of toner based on the adjustment setting, during the period from the date on which the adjustment setting is received to the timing of delivery 700. In the example of FIG. 7, the image forming apparatus A can adjust the consumption amount of toner in the period from day 0 to day 40.

Figure 8:
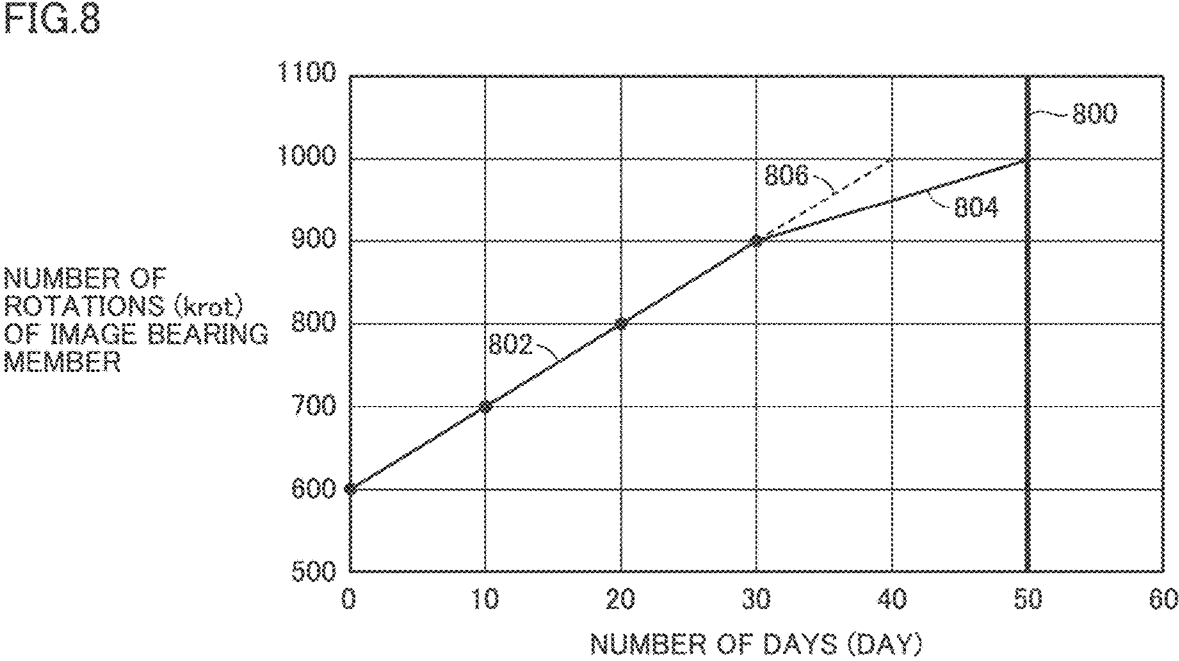
FIG. 8 is a diagram illustrating an example of a process of reducing consumption of an image bearing member.

FIG. 8 is a diagram illustrating an example of a process of reducing consumption of the image bearing member. As described above with reference to FIG. 7, in one example, a process of adjusting for reducing consumption of the image bearing member 304 of the image forming apparatus B which is one of the image forming apparatuses 250 will be described. FIG. 8 shows a graph 802, a graph 804, a graph 806, and a timing of delivery 800. In the example of FIG. 8, the delivery management apparatus 200 determines that the timing of delivery 700 is 50 days from the present time.

The graph 802 is a graph indicating the predicted progress of the consumption amount (the number of rotations) of the image bearing member 304 from day 0 (present time) to day 30 in the image forming apparatus B. The graph 806 is a continuation from the graph 802. The graph 806 is a graph indicating the predicted progress of the consumption amount of the image bearing member 304 from day 30 to day 40 in the image forming apparatus B, in the case where the number of rotations of the image bearing member 304 is not adjusted. The graph 804 is a continuation from the graph 802. The graph 804 is a graph indicating the predicted progress of the consumption amount of the image bearing member 304 from 30 days to 50 days after the present time in the image forming apparatus B, in the case where the number of rotations of the image bearing member 304 is adjusted.

Here, it is assumed that the image forming apparatus B continues using the image bearing member 304 without performing the adjustment setting for the consumption amount of the image bearing member 304. In this case, as can be seen from the graph 806, a shortage of the image bearing member 304 in the image forming apparatus B will occur before the timing of delivery 800.

The delivery management apparatus 200 receives information on the consumption state (or information on the remaining life) of one or more consumables, from the image forming apparatus B. Then, the delivery management apparatus 200 detects, from the information on the consumption state of the one or more consumables, that a shortage of the image bearing member 304 of the image forming apparatus B will occur before the timing of delivery 800.

Therefore, the delivery management apparatus 200 generates an adjustment setting for the image forming apparatus B, including a setting to adjust the consumption amount of the image bearing member 304. Then, the delivery management apparatus 200 transmits the adjustment setting for the image forming apparatus B to the image forming apparatus B.

The image forming apparatus B adjusts the consumption amount of the image bearing member 304 based on the received adjustment setting. Information such as the adjustment amount and the adjustment start timing for the image bearing member 304 is included in the adjustment setting. In one example, when 20 days remain to the timing of delivery 800, the image forming apparatus B adjusts the consumption amount of the image bearing member 304 based on the adjustment setting.

Thus, the image forming apparatus B can prevent a shortage of the image bearing member 304 from occurring before the timing of delivery 800. In another example, the image forming apparatus B may adjust the consumption amount of the image bearing member 304 immediately after receiving the adjustment setting (day 0).

It is assumed that the number of rotations of the image bearing member 304 of the image forming apparatus B at the present time (day 0) is 600 krot. At this time, the remaining available amount of the image bearing member 304 is 400 krot (threshold value 604 (1000 rot)−the current number of rotations (600 krot)). It is also assumed that 10 krot of the image bearing member 304 is used per day on the average. In this case, the consumption amount of the image bearing member 304 in 50 days is 500 krot (10 krot×50 days=500 krot), which exceeds the remaining available amount (400 krot). Therefore, a shortage of the image bearing member 304 will occur 50 days later, which is the timing of delivery 800.

Therefore, the image forming apparatus B needs to adjust the consumption amount of the image bearing member 304 so that the number of rotations of the image bearing member 304 is equal to or less than the threshold value 604 (1000 krot) before the timing of delivery 800.

In one example, when it is 20 days (30th day) to the timing of delivery 800, the image forming apparatus B adjusts to reduce the consumption amount of the image bearing member 304. In the case where the image forming apparatus B consumes 10 krot per day of the image bearing member 304 for 30 days, the number of rotations of the image bearing member on the 30th day is the remaining 100 krot (10 krot×30 days=300 krot, 600 krot+300 krot=900 krot). The image bearing member 304 that is available in the remaining 20 days is 100 krot (threshold value 604 (1000 krot)−the current usage amount (900 krot)).

Therefore, the delivery management apparatus 200 incorporates, in the adjustment setting for the image forming apparatus B, the setting for reducing the number of rotations of the image bearing member 304 so that the consumption amount per day for the remaining 20 days is 5 krot (100 krot÷20 days=5 krot/day) or less. The image forming apparatus B can reduce, based on the adjustment setting, consumption of the image bearing member 304 to prevent a shortage of the image bearing member 304 from occurring before the determined same timing of delivery.

In a certain aspect, the image forming apparatus B may adjust the consumption amount of the image bearing member 304 based on the adjustment setting, during the period from the date on which the adjustment setting is received to the timing of delivery 800. In the example of FIG. 8, the image forming apparatus B can adjust the consumption amount of the image bearing member 304 during the period from day 0 to day 50.

Figure 9:
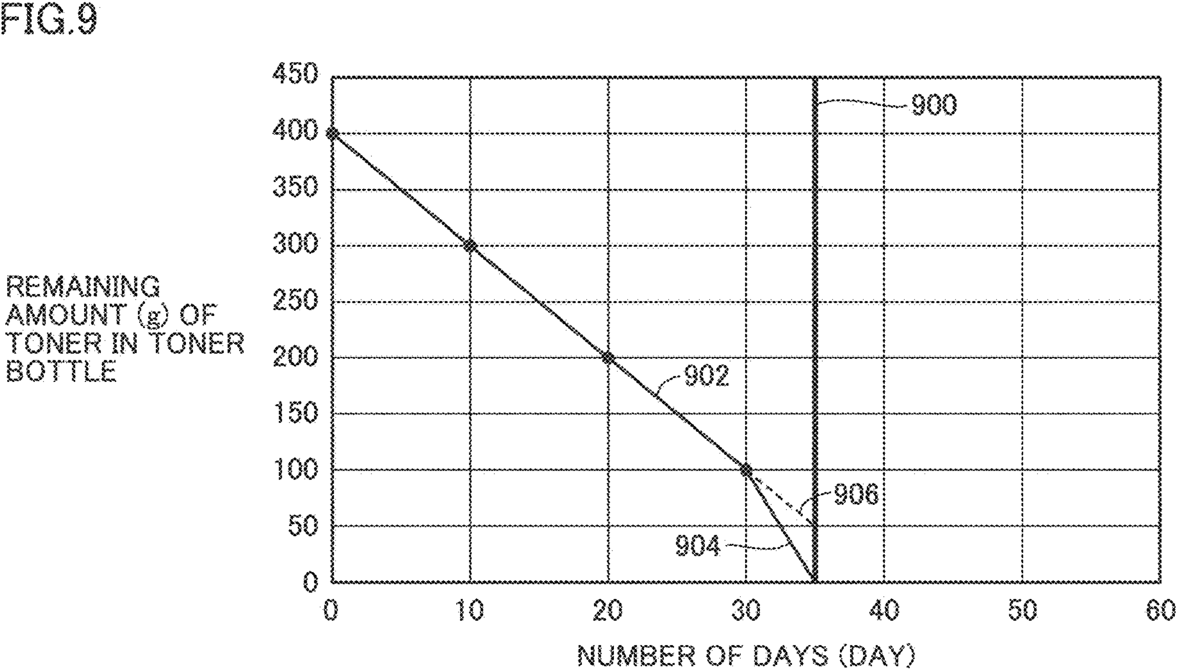
FIG. 9 is a diagram illustrating an example of a process of accumulating toner in the image forming apparatus.

FIG. 9 is a diagram illustrating an example of a process of accumulating toner in the image forming apparatus. When a small amount of toner remains in the toner bottle at the timing of delivery, the image forming apparatus 250 performs a function of transferring this toner to a sub-hopper. If a small amount of toner remains in the toner bottle at the timing of delivery, the toner bottle cannot be replaced. In this case, it is necessary to provide a place for storing a delivered new toner bottle, which imposes a burden on the user.

Therefore, when a small amount of toner is contained in the toner bottle at the timing of delivery, the image forming apparatus 250 transfers (retracts) the toner in the toner bottle to the sub-hopper. Thus, at the timing of delivery, the toner bottle is empty and can therefore be replaced.

As described above with reference to FIG. 8, in one example, a process of adjusting the amount of toner to be transferred from the toner bottle to the sub-hopper of an image forming apparatus C, which is one of the image forming apparatuses 250, will be described. FIG. 9 illustrates a graph 902, a graph 904, a graph 906, and a timing of delivery 900. In the example of FIG. 9, the delivery management apparatus 200 determines that the timing of delivery 900 is 35 days from the present time.

The graph 902 is a graph indicating a predicted change in the amount of toner in the toner bottle, in the period from day 0 (present time) to day 30 in the image forming apparatus C. The graph 906 is a continuation from the graph 902. The graph 906 is a graph indicating a predicated change of the amount of toner in the toner bottle, in the period from day 30 to day 35 in the image forming apparatus C, in the case where the toner amount is not adjusted. The graph 904 is a continuation from the graph 902. The graph 904 is a graph indicating a predicted change of the amount of toner in the toner bottle during the period from day 30 to day 35 in the image forming apparatus C, in the case where the toner amount is adjusted.

The adjustment herein refers to adjustment of the amount of toner to be transferred from the toner bottle to the sub-hopper. More specifically, the graph 904 indicates that the image forming apparatus C transfers more toner to the sub-hopper than the graph 906. However, the image forming apparatus C does not increase the amount of toner to be used for one printing operation.

Here, it is assumed that the image forming apparatus C continues using the toner in the toner bottle without performing the adjustment setting for the amount of toner in the toner bottle. In this case, as can be seen from the graph 906, the toner in the toner bottle in the image forming apparatus C remains in the toner bottle even when the timing of delivery 900 arrives.

That is, at the timing of delivery 900, the toner bottle cannot be replaced with a delivered new toner bottle. Therefore, it is necessary to have a place for storing the delivered new toner bottle, which imposes a burden on the user.

The delivery management apparatus 200 receives information on the consumption state (or information on the remaining life) of one or more consumables, from the image forming apparatus C. Then, the delivery management apparatus 200 detects that a small amount of toner remains in the toner bottle at the timing of delivery 900, from the information on the consumption state of one or more consumables.

Therefore, the delivery management apparatus 200 generates an adjustment setting for the image forming apparatus C, including a setting for adjusting the amount of toner in the toner bottle. The setting for adjusting the amount of toner herein refers to a setting of the amount of toner to be transferred from the toner bottle to the sub-hopper at timing of delivery 900. Next, the delivery management apparatus 200 transmits the adjustment setting for the image forming apparatus C to the image forming apparatus C.

The image forming apparatus C adjusts the amount of toner to be transferred from the toner bottle to the sub-hopper, based on the received adjustment setting. Information such as the adjustment amount and the adjustment start timing of the toner to be transferred to the sub-hopper is included in the adjustment setting. In one example, when it is five days to the timing of delivery 900, the image forming apparatus C adjusts, based on the adjustment setting, the amount of toner to be transferred from the toner bottle to the sub-hopper.

Thus, the image forming apparatus C can transfer the remaining toner to the sub-hopper to empty the toner bottle, by the timing of delivery 900. In another example, the image forming apparatus C may adjust the amount of toner to be transferred from the toner bottle to the sub-hopper, immediately after receiving the adjustment setting (day 0).

It is assumed that the remaining amount of toner in the toner bottle of the image forming apparatus C at the present time (day 0) is 400 g. At this time, the remaining available amount of toner in the toner bottle is 395 g (current remaining amount (400 g)−threshold value 602 (5 g)). Further, it is assumed that 10 g of toner is consumed per day on the average. In this case, 50 g of toner will remain in the toner bottle, even after 35 days, which is the timing of delivery 900 (current remaining amount (400 g)−expected usage amount (10 g×35 days=350 g)).

Therefore, the image forming apparatus C needs to adjust the amount of toner to be transferred from the toner bottle to the sub-hopper so that the toner of the threshold value 602 (5 g) or less remains before the timing of delivery 900.

Therefore, in one example, when it is 5 days (day 30) to the timing of delivery 900, the image forming apparatus C increases the amount of toner to be transferred from the toner bottle to the sub-hopper, based on the adjustment setting. By doing so, the image forming apparatus C empties the toner in the toner bottle (or reduces the toner to the threshold value 602 or less) before the timing of delivery 900. Thus, the toner bottle can be replaced at timing of delivery 900.

When toner is fed from the toner bottle to the developer bearing member 306, the image forming apparatus 250 stores the toner from the toner bottle in the sub-hopper. The sub-hopper discharges toner to the developer bearing member 306 at the timing when toner is required to be fed to the developer bearing member 306. The image forming apparatus 250 replenishes the sub-hopper with toner from the toner bottle, when the sub-hopper is emptied of toner to some extent. Therefore, the sub-hopper is not always full of toner.

Therefore, the image forming apparatus C can make the toner bottle empty of toner or make the toner in the toner bottle equal to or less than the threshold value 602, at the timing of delivery, while preventing the toner from being excessively used, by transferring the toner in the toner bottle to the sub-hopper.

In a certain aspect, the image forming apparatus C may adjust the amount of toner to be transferred from the toner bottle to the sub-hopper, based on the adjustment setting, during the period from the date on which the adjustment setting is received to the timing of delivery 900.

In another aspect, the image forming apparatus 250 may discharge toner from the sub-hopper to the developer bearing member 306, when the sub-hopper is full of toner. In this way, the image forming apparatus 250 can transfer a larger amount of toner from the toner bottle to the sub-hopper.

D. Execution of Adjustment Setting

As described above, it is assumed that the delivery management apparatus 200 determines, based on information on the consumption state of a consumable received from each image forming apparatus 250, that a shortage of the consumable will occur before the timing of delivery. In this case, the delivery management apparatus 200 determines that adjustment setting should be performed for reducing the consumption amount of the consumable.

Then, the delivery management apparatus 200 transmits a generated adjustment setting to the target image forming apparatus 250. The image forming apparatus 250 performs a process of reducing the consumption amount of the consumable in accordance with the received adjustment setting. The image forming apparatus 250 can adjust the consumption amount of the consumable using the methods illustrated in FIGS. 10 to 16, in one example.

Figure 10:
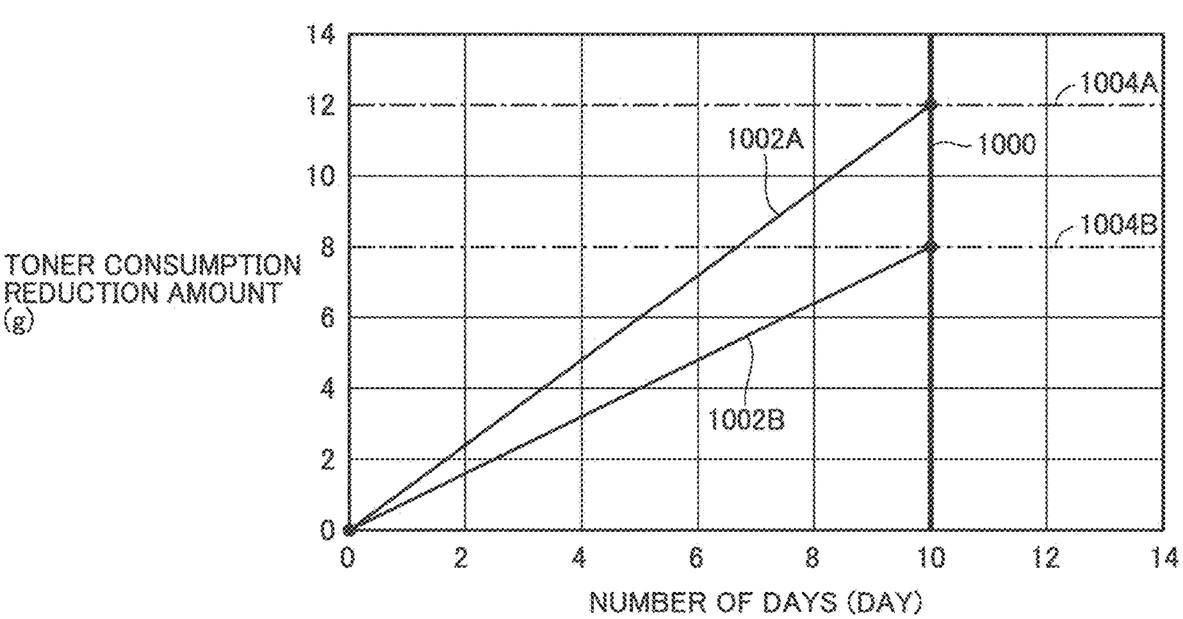
FIG. 10 is a diagram illustrating an example of a process of reducing a consumption amount of toner by increasing a fog margin.

FIG. 10 is a diagram illustrating an example of a process of reducing a consumption amount of toner by increasing a fog margin. There are several types of processes for reducing the consumption amount of toner. One of them is a method for reducing the consumption amount of toner by changing the fog margin to be higher than an original set value.

The fog margin is a potential difference between the developer bearing member 306 and the image bearing member 304. In the image forming apparatus 250, toner is moved from the developer bearing member 306 to the image bearing member 304 by the potential difference between the developer bearing member 306 and the image bearing member 304.

When the fog margin is increased, the consumption amount of toner can be reduced. Usually, when the fog margin is increased, toner adhesion stripe noise is likely to occur on the image bearing member 304. However, the default setting value for the fog margin of the image forming apparatus 250 has a margin of 50 V until the setting value reaches a setting value at which toner adhesion stripe noise is generated on the image bearing member 304.

Therefore, the image forming apparatus 250 increases the fog margin within 50 V from the default setting, so that the consumption amount of toner can be reduced while avoiding the problem that the toner adhesion stripe noise is generated on the image bearing member 304.

The process of reducing the toner consumption amount by increasing the fog margin will be described more specifically with reference to the graph of FIG. 10. For example, it is assumed that the delivery management apparatus 200 determines a timing of delivery 1000 that is 10 days later, based on information on the consumption state of the consumable received from each image forming apparatus 250.

Further, it is assumed that, in the case where toner of the image forming apparatus 250 is used in the usual manner until the timing of delivery 1000 after 10 days, the delivery management apparatus 200 detects a shortage of toner at the timing of delivery 1000 which is 10 days later. In this case, the delivery management apparatus 200 calculates an amount by which the toner consumption amount is to be reduced before the timing of delivery 1000, in order to prevent shortage of toner in the image forming apparatus 250 until the timing of delivery 1000 which is 10 days later.

In FIG. 10, a toner consumption reduction amount 1004A and a toner consumption reduction amount 1004B represent respective toner consumption amounts by which the toner amount needs to be reduced by the timing of delivery 1000. Further, graphs 1002A and 1002B represent respective daily toner consumption amounts to be reduced by the timing of delivery 1000.

In one example, the toner consumption reduction amount 1004A indicates that it is necessary to reduce the toner consumption amount by 12 g in 10 days to the timing of delivery 1000, in order to prevent shortage of the toner of the image forming apparatus 250. In this case, as indicated by the graph 1002A, the image forming apparatus 250 needs to reduce the consumption of toner by 1.2 g per day (12 g÷10 days=1.2 g/day).

In another example, the toner consumption reduction amount 1004B indicates that it is necessary to reduce the toner consumption amount by 8 g in 10 days to the timing of delivery 1000, in order to prevent shortage of the toner of the image forming apparatus 250. In this case, as indicated by the graph 1002B, the image forming apparatus 250 needs to reduce the consumption of toner by 0.8 g per day (8 g÷10 days=0.8 g/day).

The delivery management apparatus 200 generates an adjustment setting for the fog margin, including an increase of the fog margin, so that the consumption of the toner can be reduced by a predetermined amount as described above. The image forming apparatus 250 executes this process based on the adjustment setting for the fog margin, to prevent a shortage of the toner from occurring before the timing of delivery 1000.

Figure 11:
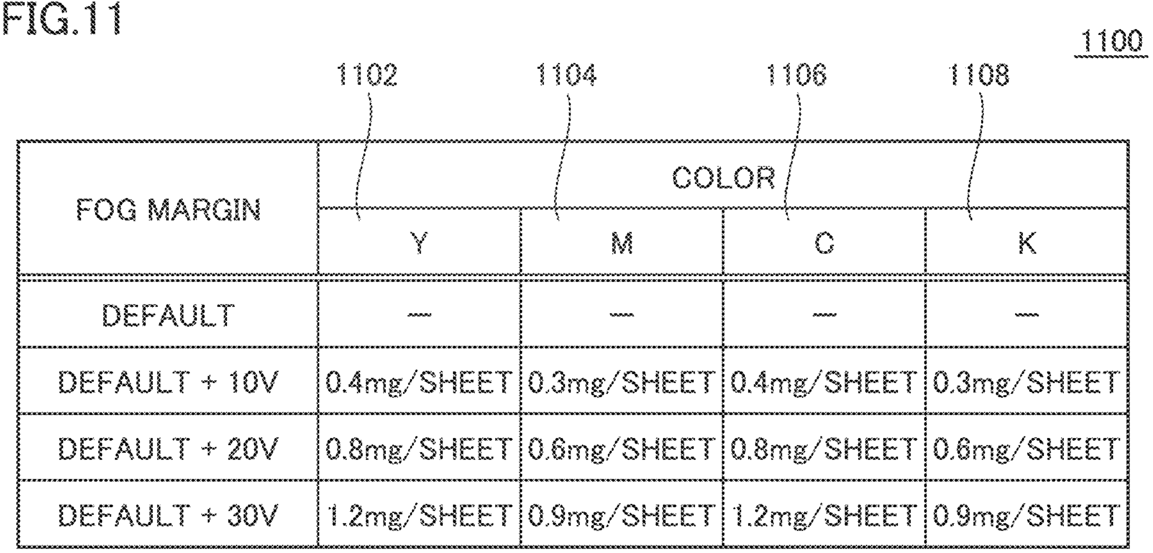
FIG. 11 is a diagram illustrating an example of an amount by which a toner consumption is to be reduced, for each value of a fog margin.

FIG. 11 is a diagram illustrating an example of an amount by which a toner consumption is to be reduced, for each value of the fog margin. The delivery management apparatus 200 may include a table 1100, as illustrated in FIG. 11, which includes the amount by which the toner consumption is to be reduced per sheet of medium for each toner color, when a default fog margin is increased by 10 V, 20 V, and 30 V and becomes each value of the fog margin.

With reference to FIG. 10, description is made for the process that is performed in the case where it is necessary to reduce the toner consumption amount by 1.2 g and 0.8 g per day before the timing of delivery. A description will be given of the process of reducing the toner consumption using the table 1100 in such a case. Columns 1102, 1104, 1106, and 1108 of the table 1100 each indicate an amount by which the toner consumption is to be reduced, for each value of the fog margin for each color of toner.

It is assumed that, in order to prevent shortage of toner in the image forming apparatus 250, it is necessary to reduce the toner consumption amount by 12 g in 10 days to the timing of delivery 1000 as indicated by the toner consumption reduction amount 1004A. In this case, it is necessary to reduce the toner consumption amount by 1.2 g per day (12 g÷10 days=1.2 g/day).

When the toner is yellow (Y) and the number of sheets printed per day by the image forming apparatus 250 is 1000 sheets on the average, it is necessary to reduce the toner consumption amount by 1.2 mg per sheet per day (1.2 g÷1000 sheets=1.2 mg/sheet). Therefore, the image forming apparatus 250 increases the fog margin by 30 V from the default based on the column 1102 of the table 1100.

Similarly, when the toner is C (cyan), it is necessary to reduce the toner consumption amount by 1.2 mg per sheet per day. Therefore, the image forming apparatus 250 increases the fog margin by 30 V from the default based on the column 1106 of the table 1100.

Next, a description will be given of a case where, in order to prevent shortage of toner in the image forming apparatus 250, it is necessary to reduce the toner consumption amount by 8 g in 10 days to the timing of delivery 1000, as indicated by the toner consumption reduction amount 1004B. In this case, it is necessary to reduce the toner consumption amount by 0.8 g per day (8 g÷10 day=0.8 g/day).

When the toner is Y (yellow), it is necessary to reduce the toner consumption amount by 1.2 mg per sheet per day. Therefore, the image forming apparatus 250 needs to increase the default fog margin by 20 V based on the column 1102 of the table 1100.

Similarly, when the toner is magenta (M), it is necessary to reduce the toner consumption amount by 1.2 mg per sheet per day. Therefore, the image forming apparatus 250 needs to increase the default fog margin by 30 V based on the column 1104 of the table 1100.

As described above, the image forming apparatus 250 changes the toner consumption amount by changing the fog margin in the image forming apparatus 250, based on the received adjustment setting.

Figure 12:
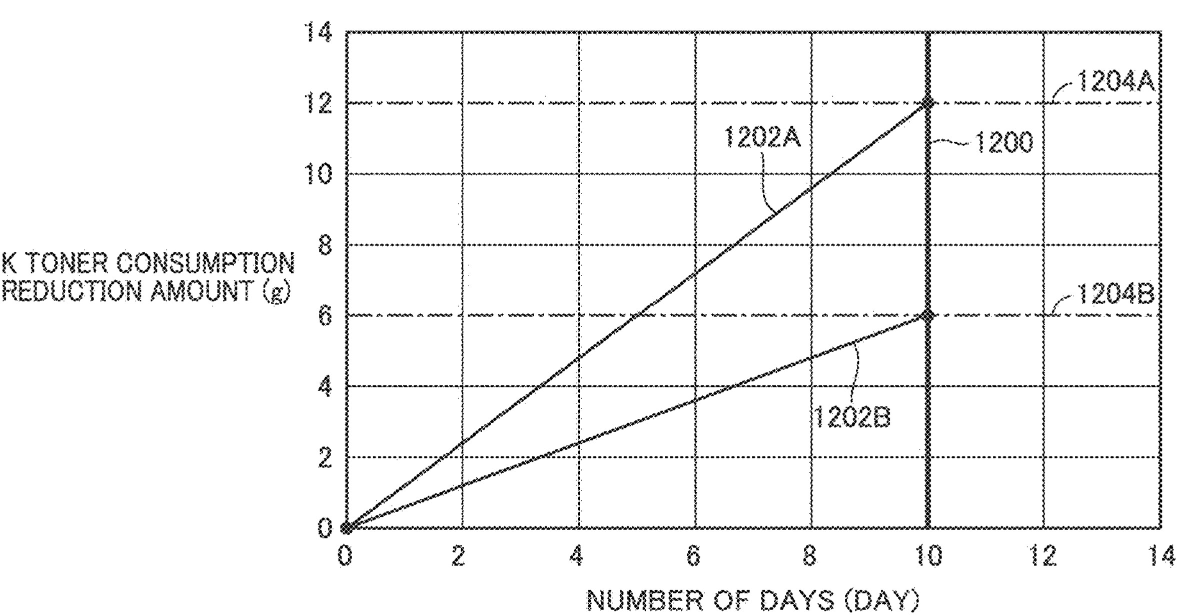
FIG. 12 is a diagram illustrating an example of a process of reducing a consumption amount of toner of K, by using toner of other colors.

FIG. 12 is a diagram illustrating an example of a process of reducing the consumption amount of toner of K, by using toner of other colors. The toner has a characteristic of becoming close to the color K when mixed with Y toner, M toner, and C toner. When printing an image in which a portion for which the K toner is used is not conspicuous on a medium by making use of this characteristic, the image forming apparatus 250 uses not only the K toner but also the Y toner, the M toner, and the C toner that are mixed with the K toner, for printing the K portion of the image. Thus, the image forming apparatus 250 can generate a print image substantially identical in appearance to the image printed with only the K toner, while reducing the usage of the K toner.

The process of reducing the consumption amount of the K toner by using the Y toner, the M toner, and the C toner, instead of the K toner will be described in more detail with reference to the graph of FIG. 12. For example, it is assumed that the delivery management apparatus 200 determines that the timing of delivery 1200 is 10 days later, based on information on the consumption state of the consumable received from each image forming apparatus 250.

Furthermore, the delivery management apparatus 200 can determine whether shortage of the K toner occurs, based on information on the consumption state of the K toner of the image forming apparatus 250. It is assumed that the delivery management apparatus 200 detects that, in the case where the K toner is used in the usual manner in the image forming apparatus 250 until the timing of delivery 1200 that is 10 days later, a shortage of the K toner will occur.

In this case, the delivery management apparatus 200 calculates the amount by which the consumption amount of the K toner is to be reduced by the timing of delivery 1200, in order to prevent shortage of the K toner of the image forming apparatus 250 until the timing of delivery 1200 which is 10 days later.

Here, in FIG. 12, a K toner consumption reduction amount 1204A and a K toner consumption reduction amount 1204B represent respective K toner amounts by which the consumption needs to be reduced by the timing of delivery 1200. Furthermore, graphs 1202A and 1202B represent respective daily K toner consumption amounts to be reduced by the timing of delivery 1200.

In one example, the K toner consumption reduction amount 1204A indicates that it is necessary to reduce the K toner consumption amount by 12 g in 10 days to the timing of delivery 1200, in order to prevent shortage of the K toner of the image forming apparatus 250. In this case, as indicated by the graph 1202A, the image forming apparatus 250 needs to reduce the K toner consumption amount by 1.2 g per day (12 g÷10 days=1.2 g/day).

Here, it is assumed that the number of sheets printed per day by the image forming apparatus 250 is 1000 sheets on the average. Furthermore, it is assumed that, in the case where the K toner is to be adhered to the whole one side of an A4 sheet, approximately 0.24 g of the K toner is consumed for printing one sheet. In the case where the print coverage of the K toner is 5% on the average, 0.012 g (0.24 g/sheet×5%=0.012 g/sheet) of the K toner is consumed per sheet. That is, 12 g (0.012 g/sheet×1000 sheets=12 g) of the K toner is consumed per day.

In consideration of the image density, the ratio of the K toner in a black portion of a print image can be lowered to 90%. That is, 10% of the K toner in the black portion of the print image can be substituted by a mixture of the Y toner, the M toner, and the C toner to generate black.

In the present example, the consumption amount of the K toner needs to be reduced by 1.2 g per day. Therefore, the image forming apparatus 250 sets the ratio of the K toner in the black portion of the print image to 90% (1.2 g/day÷12 g/day=10%), (100%−10%=90%) or less.

In another example, the toner consumption reduction amount 1204B for K indicates that, in order to prevent shortage of the K toner in the image forming apparatus 250, it is necessary to reduce the consumption amount of the K toner by 6 g in 10 days to the timing of delivery 1200. In this case, as indicated by the graph 1202B, the image forming apparatus 250 needs to reduce the consumption amount of the K toner by 0.6 g per day (6 g÷10 days=0.6 g/day).

Here, similarly to the above-described example, it is necessary to reduce the consumption amount of the K toner by 0.6 g per sheet per day. Therefore, the image forming apparatus 250 sets the ratio of the K toner in the black portion of the print image to 95% (0.6 g/day÷12 g/day=5%), (100%−5%=95%) or less.

The delivery management apparatus 200 generates an adjustment setting for reducing the consumption of the K toner, including the usage amount of the Y toner, the M toner, and the C toner, so that the reduction of the consumption of the K toner determined as described above can be decreased.

The image forming apparatus 250 performs the process of using the Y toner, the M toner, and the C toner instead of the K toner, based on the adjustment setting for reduction of the consumption of the K toner, to prevent shortage of the K toner before the timing of delivery 1200.

As described above, the image forming apparatus 250 changes the consumption amount of the black toner by increasing respective toner consumption amounts of other colors in forming an image using the black toner, based on the received adjustment setting.

Figure 13:
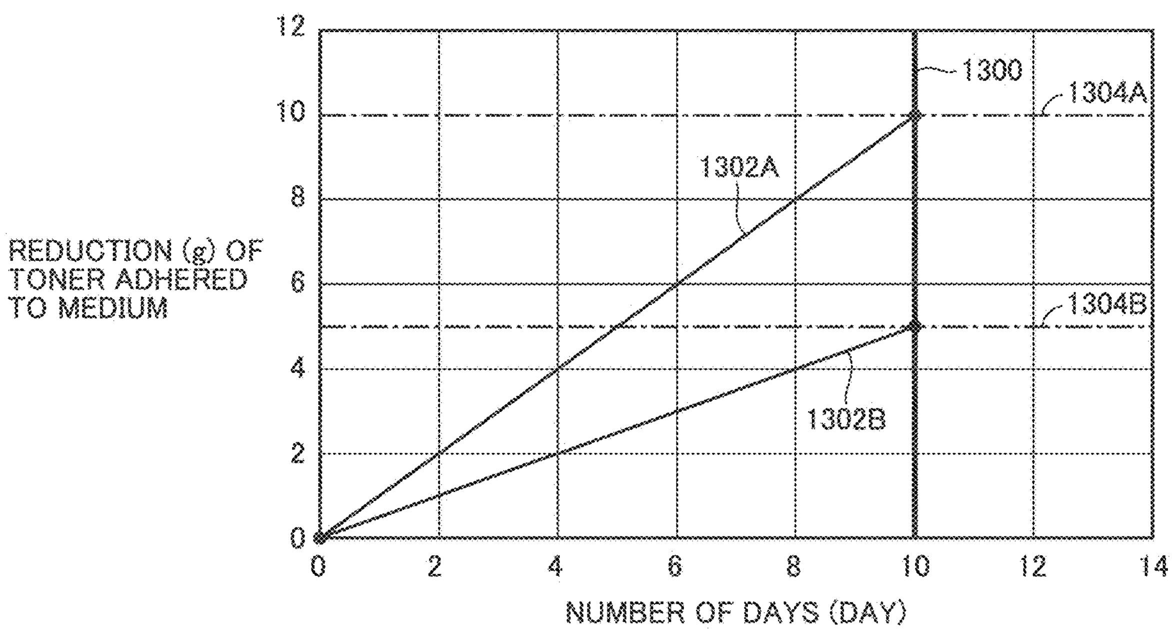
FIG. 13 is a diagram illustrating an example of a process of changing a consumption amount of toner by changing an amount of toner adhered to a medium.

FIG. 13 is a diagram illustrating an example of a process of changing a consumption amount of toner by changing an amount of toner adhered to a medium. With reference to a graph of FIG. 13, a description will be given of a process of reducing the toner consumption amount by reducing the amount of toner adhered to a medium, relative to the usual amount of toner adhered to a medium. Reducing the amount of toner adhered to a medium means that the density of a print image is made slightly lower to reduce the toner consumption amount.

That is, the image forming apparatus 250 can adjust the amount of toner adhered to a medium by controlling the degree to which the density of the print image is reduced. Thus, the image forming apparatus 250 can control the toner consumption amount.

For example, it is assumed that the delivery management apparatus 200 determines that a timing of delivery 1300 is 10 days later, based on information on the consumption state of the consumable received from each image forming apparatus 250. Furthermore, the delivery management apparatus 200 can determine, based on the information on the consumption state of the consumable of the image forming apparatus 250 to the present time, whether or not shortage of toner occurs.

It is assumed that, in the case where the toner in the image forming apparatus 250 is used in the usual manner until the timing of delivery 1300 which is 10 days later, the delivery management apparatus 200 detects that shortage of the toner will occur at the timing of delivery 1300 which is 10 days later.

In this case, the delivery management apparatus 200 calculates an amount by which the toner consumption amount is to be reduced by the timing of delivery 1300, in order to prevent shortage of toner in the image forming apparatus 250 until the timing of delivery 1300 which is 10 days later.

Here, in FIG. 13, a toner consumption reduction amount 1304A and a toner consumption reduction amount 1304B each represent an amount by which the toner consumption amount needs to be reduced by the timing of delivery 1300. The amount by which the toner consumption amount needs to be reduced by the timing of delivery 1300 may be obtained for each color toner. The same applies to respective processes illustrated in FIG. 14 and subsequent drawings. Graphs 1302A and 1302B each represent the amount by which the toner consumption amount needs to be reduced per day by the timing of delivery 1300.

Reduction of the toner consumption will be described in connection with the Y toner as an example. In this case, the toner consumption reduction amount 1304A and the toner consumption reduction amount 1304B each represent the amount by which the Y toner consumption amount needs to be reduced by the timing of delivery 1300.

In one example, the Y toner consumption reduction amount 1304A indicates that it is necessary to reduce the Y toner consumption amount by 10 g in 10 days to the timing of delivery 1300, in order to prevent shortage of the Y toner in the image forming apparatus 250. In this case, as indicated by the graph 1302A, the image forming apparatus 250 reduces the Y toner consumption amount by 1 g per day (10 g÷10 days=1 g/day).

Here, it is assumed that the number of sheets printed per day by the image forming apparatus 250 is 1000 sheets on the average. Furthermore, it is assumed that, in the case where the Y toner is to be adhered to the whole one side of an A4 sheet, approximately 0.2 g of the Y toner is consumed for printing one sheet. In the case where the print coverage of the Y toner is 5% on the average, 0.01 g (0.2 g/sheet×5%=0.01 g/sheet) of the Y toner is consumed per sheet. That is, 10 g (0.01 g/sheet×1000 sheets=10 g) of the Y toner is consumed per day.

In the present example, since the Y toner consumption amount needs to be reduced by 1 g per sheet per day, the image forming apparatus 250 needs to reduce the amount of toner adhered to the sheet by 10% (1 g/day÷10 g/day=10%).

In another example, the Y toner consumption reduction amount 1304B indicates that, in order to prevent shortage of the Y toner in the image forming apparatus 250, it is necessary to reduce the Y toner consumption amount by 5 g in 10 days to the timing of delivery 1300. In this case, as indicated by the graph 1302B, the image forming apparatus 250 reduces the Y toner consumption amount by 0.5 g per day (5 g÷10 days=0.5 g/day).

Here, similarly to the above-described example, since it is necessary to reduce the Y toner consumption amount by 0.5 g per sheet per day, the image forming apparatus 250 reduces the amount of the Y toner adhered to the sheet by 5% (0.5 g/day÷10 g/day=5%).

The delivery management apparatus 200 generates an adjustment setting for the amount of toner to be adhered to a medium, so that the toner consumption can be reduced by a predetermined amount. The image forming apparatus 250 executes the process based on the adjustment setting for the amount of toner to be adhered to the medium, to prevent shortage of the toner before the timing of delivery 1300.

As described above, the image forming apparatus 250 changes the toner consumption amount by lowering the density of the print image to change the amount of toner adhered to the medium, based on the received adjustment setting.

Figure 14:
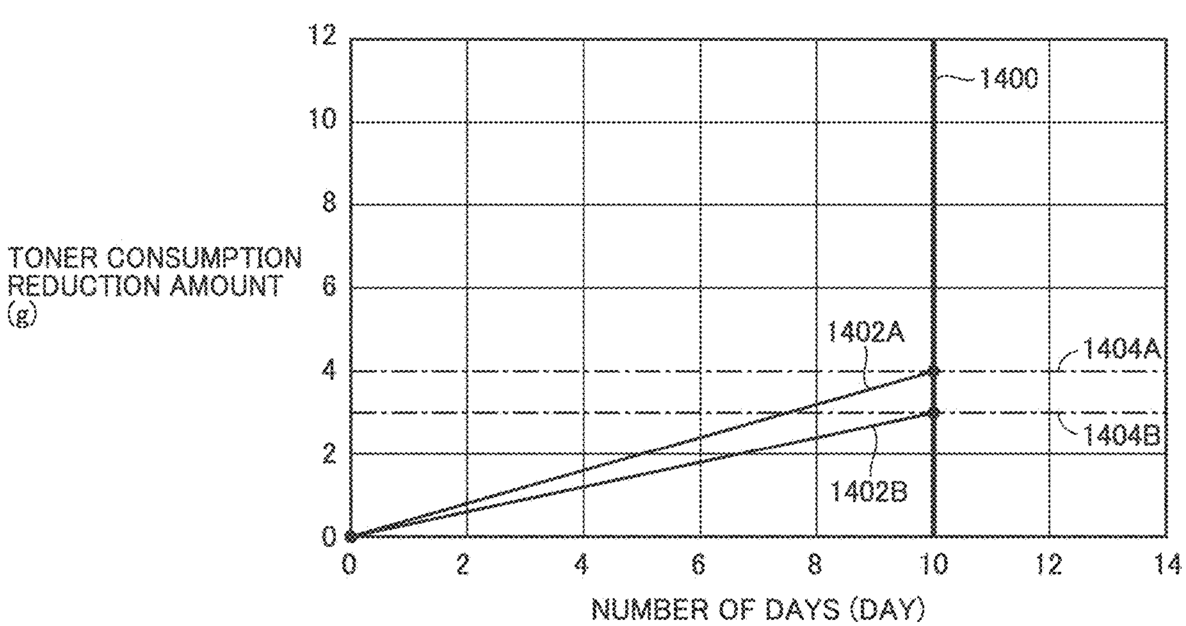
FIG. 14 is a diagram illustrating an example of a process of changing respective consumption amounts of toner, an image bearing member, a developer bearing member (or developer carrier), and an intermediate transfer member (or intermediate transfer body), by changing the number of times of density adjustment is made.

FIG. 14 is a diagram illustrating an example of a process of changing respective consumption amounts of the toner, the image bearing member, the developer bearing member 306, and the intermediate transfer member, by changing the number of times density adjustment is made. With reference to a graph of FIG. 14, a description will be given of a process of reducing the toner consumption amount by reducing the number of times the density adjustment is made, through image stabilization.

Image stabilization refers to adjustment of the image density or adjustment of registration, each time the number of sheets printed by the image forming apparatus 250 reaches a predetermined number of sheets to be printed, or each time a predetermined environmental change (a change in temperature, humidity, or the like) occurs in the surrounding environment in which the image forming apparatus 250 is installed. The predetermined number of sheets to be printed may be any number of sheets such as 500 sheets. The predetermined environmental change may for example be a change from a low-temperature low-humidity environment to a high-temperature high-humidity environment. In a certain aspect, the image forming apparatus 250 may determine that the number of printed sheets has reached a predetermined number or more of sheets to be printed, based on the fact that the number of printed sheets is equal to or more than a predetermined threshold value of the number of sheets to be printed. In another aspect, the image forming apparatus 250 may determine that a predetermined environmental change has occurred, based on the fact that the temperature has changed to a temperature equal to or more than a predetermined temperature threshold value. Similarly, the image forming apparatus 250 may determine that a predetermined environmental change has occurred, based on the fact that the humidity has changed to a humidity equal to or more than a predetermined humidity threshold value.

For performing the density adjustment, the image forming apparatus 250 needs to form a patch image with a predetermined density, which consumes toner. In one example, it is assumed that the image forming apparatus 250 usually performs image stabilization once, every time 500 sheets are printed. Even if image stabilization is performed once, every time 1000 sheets are printed, basically there is no significant influence on the image density.

Therefore, the image forming apparatus 250 can reduce the toner consumption amount by reducing the number of times density adjustment is made, to the extent that does not cause a significant influence on print images. Furthermore, when image stabilization is performed, the image forming apparatus 250 also needs to drive the image bearing member 304, the developer bearing member 306, and the intermediate transfer member 308. Therefore, the image forming apparatus 250 can also reduce the consumption amount of the image bearing member 304, the developer bearing member 306, and the intermediate transfer member 308, by reducing the number of times density adjustment is made.

For example, it is assumed that the delivery management apparatus 200 determines that the timing of delivery 1400 is 10 days later, based on information on the consumption state of the consumable received from each image forming apparatus 250. Furthermore, it is assumed that the delivery management apparatus 200 detects, based on the information on the consumption state of the consumables of the image forming apparatus 250 to the present time, that in the case where toner in the image forming apparatus 250 is used in the usual manner until the timing of delivery 1400 which is 10 days later, a shortage of the toner will occur at the timing of delivery 1400 which is 10 days later.

In this case, the delivery management apparatus 200 calculates an amount by which the toner consumption amount is to be reduced by the timing of delivery 1400, in order to prevent shortage of toner in the image forming apparatus 250 until the timing of delivery 1400 which is 10 days later.

Here, in FIG. 14, a toner consumption reduction amount 1404A and a toner consumption reduction amount 1404B each represent an amount by which the toner consumption amount needs to be reduced by the timing of delivery 1400. Graphs 1402A and 1402B each represent the amount by which the toner consumption amount needs to be reduced per day by the timing of delivery 1400.

Reduction of the toner consumption will be described in connection with the Y toner as an example. In this case, the toner consumption reduction amount 1404A and the toner consumption reduction amount 1404B each represent the amount by which the Y toner consumption amount needs to be reduced by the timing of delivery 1400.

In one example, the Y toner consumption reduction amount 1404A indicates that it is necessary to reduce the Y toner consumption amount by 4 g in 10 days to the timing of delivery 1400, in order to prevent shortage of the Y toner in the image forming apparatus 250. In this case, as in the graph 1402A, the image forming apparatus 250 needs to reduce the Y toner consumption by 0.4 g per day (4 g÷10 days=0.4 g/day).

Here, it is assumed that the number of sheets printed per day by the image forming apparatus 250 is 1000 sheets on the average. Furthermore, the number of times image stabilization is performed per day for the image forming apparatus 250 is about 30 on the average. The image forming apparatus 250 consumes about 0.02 g of the Y toner for performing the image stabilization once. That is, 0.6 g (0.02 g/image stabilization×30 times=0.6 g) of Y toner is consumed per day.

In the present example, since the Y toner consumption amount needs to be reduced by 0.4 g per day, the number of times the density adjustment is made through the image stabilization needs to be reduced by 20 times per day (0.4 g/day÷0.6 g/day=2/3), (30 times/day×(2/3)=20 times/day).

In another example, the Y toner consumption reduction amount 1404B indicates that, in order to prevent shortage of the Y toner in the image forming apparatus 250, it is necessary to reduce the Y toner consumption amount by 3 g in 10 days to the timing of delivery 1400. In this case, as indicated by the graph 1402B, the image forming apparatus 250 needs to reduce the Y toner consumption amount by 0.3 g per day (3 g÷10 days=0.3 g/day).

Here, similarly to the above-described example, since it is necessary to reduce the Y toner consumption amount by 0.3 g per sheet per day, the number of times the density adjustment is made through the image stabilization is required to be reduced by 15 times per day (0.3 g/day÷0.6 g/day=50%), (30 times/day×50%=15 times/day).

The delivery management apparatus 200 generates an adjustment setting for the number of times density adjustment is made, so that the toner consumption can be reduced by a predetermined amount. The image forming apparatus 250 executes the process based on the adjustment setting for the number of times the density adjustment is made, to prevent shortage of the toner before the timing of delivery 1400.

As described above, the image forming apparatus 250 changes the number of times the density adjustment is made through the image stabilization, based on the received adjustment setting, to thereby change the consumption amounts of toner, the image bearing member 304, the developer bearing member 306, and the intermediate transfer member 308.

Figure 15:
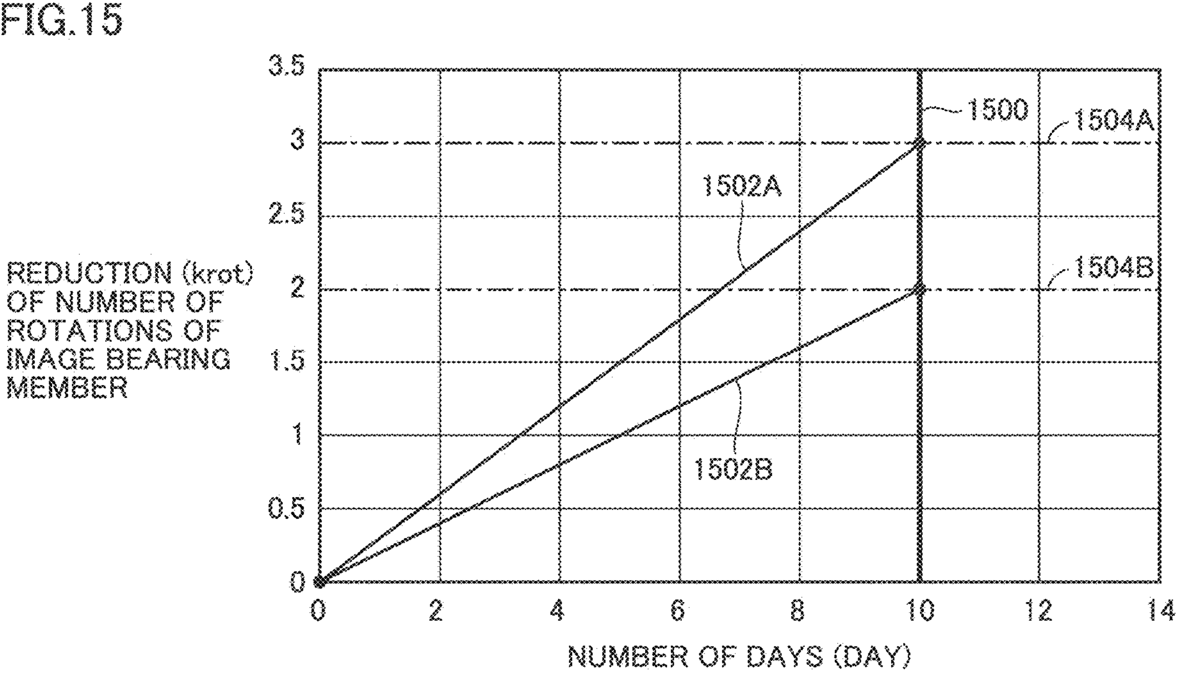
FIG. 15 is a diagram illustrating an example of a process of changing respective consumption amounts of an image bearing member, a developer bearing member, and an intermediate transfer member, by changing the number of times charging voltage adjustment is made.

FIG. 15 is a diagram illustrating an example of a process of changing respective consumption amounts of the image bearing member 304, the developer bearing member 306, and the intermediate transfer member 308, by changing the number of times charging-voltage adjustment is made. With reference to FIG. 15, a more specific description will be given of the process of reducing the consumption amount of the image bearing member 304 by reducing the number of times the charging voltage adjustment is made.

Charging voltage adjustment refers to adjustment of the charging voltage, each time the number of printed sheets reaches a predetermined number of sheets to be printed, or each time a predetermined environmental change occurs in the surrounding environment in which the image forming apparatus 250 is installed, in order to apply an appropriate charge voltage all the time to the image bearing member 304 of the image forming apparatus 250. The predetermined number of sheets to be printed may be any number of sheets such as 500 sheets. The predetermined environmental change may for example be a change from a low-temperature low-humidity environment to a high-temperature high-humidity environment.

The image forming apparatus 250 applies a charging voltage to the image bearing member 304 to cause charging current to flow, at a timing when image formation is not performed. Next, the image forming apparatus 250 acquires the charging current, detects the remaining film thickness of the image bearing member 304 based on the magnitude of the charging current, and applies, to the image bearing member 304, a charging voltage depending on the remaining film thickness.

For performing the charging voltage adjustment, the image forming apparatus 250 needs to apply a charging voltage to the image bearing member 304 to rotate it, which results in consumption of the image bearing member 304. In one example, it is assumed that the image forming apparatus 250 usually performs the charging voltage adjustment once, every time 500 sheets are printed. Even if the charging voltage adjustment is performed once, every time 1000 sheets are printed, basically there is no significant influence on application of an appropriate charging voltage.

Therefore, the image forming apparatus 250 can reduce the number of times the charging voltage adjustment is made, to the extent that does not cause a significant influence on print images, to reduce the time for which the charging voltage is applied and the number of rotations of the image bearing member 304, and thereby reduce the consumption amount of the image bearing member 304.

Here, the image bearing member 304 operates in cooperation with the developer bearing member 306 and the intermediate transfer member 308. If only the image bearing member 304 is rotated, friction increases and there is a higher possibility that each of the developer bearing member 306 and the intermediate transfer member 308 is damaged due to a difference in the number of rotations between them. Therefore, the image bearing member 304, the developer bearing member 306, and the intermediate transfer member 308 are configured to be driven together to operate in cooperation with each other all the time. Therefore, when the image bearing member 304 rotates, the developer bearing member 306 and the intermediate transfer member 308 also rotate.

Therefore, when the number of times the charging voltage adjustment is made for the image bearing member 304 changes, the number of rotations of the image bearing member 304 decreases, and the number of rotations of the developer bearing member 306 and the intermediate transfer member 308 also decreases. Furthermore, the image forming apparatus 250 can also reduce the consumption amount of the developer bearing member 306 and the intermediate transfer member 308 by reducing the number of times the charging voltage adjustment is made.

For example, it is assumed that the delivery management apparatus 200 determines that a timing of delivery 1500 is 10 days later, based on information on the consumption state of the consumable received from each image forming apparatus 250. Furthermore, it is assumed that, in the case where the image bearing member 304 of the image forming apparatus 250 is used in the usual manner until the timing of delivery 1500 which is 10 days later, a shortage of the image bearing member 304 will occur at the timing of delivery 1500 which is 10 days later. This is detected by the delivery management apparatus 200 based on the information on the consumption state of the consumable of the image forming apparatus 250 to the present time.

In this case, the delivery management apparatus 200 calculates the number of rotations (consumption amount) of the image bearing member by which the number of rotations needs to be reduced by the timing of delivery 1500 which is 10 days later, in order to prevent a shortage of the image bearing member 304 of the image forming apparatus 250.

Here, in FIG. 15, a consumption reduction amount 1504A of the image bearing member 304 and a consumption reduction amount 1504B of the image bearing member 304 each represent an amount by which the number of rotations of the image bearing member 304 needs to be reduced by the timing of delivery 1500. Furthermore, graphs 1502A and 1502B each represent an amount by which the number of rotations of the image bearing member 304 needs to be reduced per day by the timing of delivery 1500.

In one example, the consumption reduction amount 1504A of the number of rotations of the image bearing member 304 indicates that the number of rotations of the image bearing member 304 needs to be reduced by 3 krot by the timing of delivery 1500. In this case, as indicated by the graph 1502A, the image forming apparatus 250 needs to reduce the number of rotations of the image bearing member 304 by 0.3 krot per day (3 krot÷10 days=0.3 krot/day).

Here, it is assumed that the number of times the charging voltage adjustment is made per day for the image forming apparatus 250 is about 100 times on the average. In the image forming apparatus 250, the image bearing member 304 rotates approximately 4 rot for performing the charging voltage adjustment once. That is, the image bearing member 304 rotates 400 rot per day (4 rot/charging voltage adjustment×100=400 rot).

In the present example, it is necessary to reduce the number of rotations of the image bearing member 304 by 300 rot (0.3 krot) per day. In this case, since the image bearing member 304 rotates approximately 4 rot per charging voltage adjustment, the number of times charging voltage adjustment is made should be reduced by the image forming apparatus 250 per day by: "(reduction per day)/(the number of rotations per charging voltage adjustment)=300 rot/4 rot=75 times."

In another example, the consumption reduction amount 1504B for the number of rotations of the image bearing member 304 indicates that, in order to prevent shortage of the image bearing member 304 of the image forming apparatus 250, the number of rotations of the image bearing member 304 needs to be reduced by 2 krot in 10 days to the timing of delivery 1500. In this case, as indicated by the graph 1502B, the image forming apparatus 250 needs to reduce the number of rotations of the image bearing member 304 by 0.2 krot per day (2 krot÷10 days=0.2 krot/day).

Here, similarly to the above-described example, it is necessary to reduce the number of rotations of the image bearing member 304 by 200 rot (0.2 krot) per day. In this case, since the image bearing member 304 rotates approximately 4 rot per charging voltage adjustment, the number of times the charging voltage adjustment is made should be reduced by the image forming apparatus 250 per day by: "(reduction per day)/(the number of rotations per charging voltage adjustment)=200 rot/4 rot=50 times."

The delivery management apparatus 200 generates the adjustment setting for the number of rotations of the image bearing member 304, so that the predetermined number of rotations of the image bearing member 304 can be reduced as described above. The image forming apparatus 250 performs the process of reducing the number of times the charging voltage adjustment is made, based on the adjustment setting for the number of rotations of the image bearing member 304, to prevent a shortage of the image bearing member 304 from occurring by the timing of delivery 1500.

As described above, the image forming apparatus can change the consumption amount of the image bearing member 304, the developer bearing member 306, and the intermediate transfer member 308, by changing the number of times the charging voltage adjustment for the image bearing member 304 is made, based on the received adjustment setting.

The foregoing description is given of the case where the image forming apparatus 250 performs the process of reducing the consumption amount of the consumable in accordance with the received adjustment setting. Next, with reference to FIGS. 16 and 17, a description will be given of a process for the image forming apparatus 250 to adjust the consumption amount of the consumable in accordance with the received adjustment setting, so that the consumable can be replaced at the timing of delivery.

Figure 16:
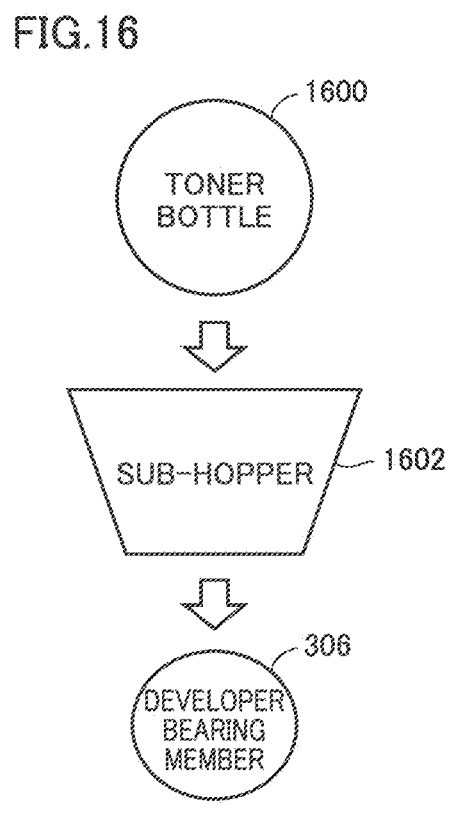

FIG. 16 is a diagram illustrating an example of a relationship between a toner bottle 1600, a sub-hopper 1602, and the developer bearing member 306. The image forming apparatus 250 uses the sub-hopper 1602 and the developer bearing member 306 in order to adjust the consumption amount of toner in the toner bottle 1600.

It is assumed that, when toner of the image forming apparatus 250 is used in the usual manner until the timing of delivery, an amount of toner exceeding the threshold value 602 remains in the toner bottle 1600. In this case, the delivery management apparatus 200 can detect that the toner bottle 1600 cannot be replaced at the timing of delivery based on the information on the consumption state of the consumable acquired from the image forming apparatus 250.

Therefore, the delivery management apparatus 200 prevents toner of the image forming apparatus 250 from remaining in the toner bottle 1600 until the timing of delivery. For this purpose, the delivery management apparatus 200 calculates the amount of toner to be transferred from the toner bottle 1600 to the sub-hopper 1602 by the timing of delivery.

Furthermore, the delivery management apparatus 200 transmits an adjustment setting including the amount of toner to be transferred, to the image forming apparatus 250. Based on the adjustment setting, the image forming apparatus 250 transfers toner from the toner bottle 1600 to the sub-hopper 1602 by the timing of delivery.

When the sub-hopper 1602 has an empty space, the image forming apparatus 250 transfers a small amount of toner remaining in the toner bottle 1600 to the sub-hopper 1602 by the timing of delivery. Thus, the image forming apparatus 250 empties the toner bottle 1600 so that the toner bottle 1600 can be replaced at the timing of delivery. In a certain aspect, it is not necessary to make the toner bottle 1600 completely empty, and it is sufficient to reduce toner to the extent that makes the toner bottle replaceable.

Usually, when toner is to be fed from the toner bottle 1600 to the developer bearing member 306, toner from the toner bottle 1600 is temporarily stored in the sub-hopper 1602. Then, the toner is discharged from the sub-hopper 1602 to the developer bearing member 306 at a timing when toner needs to be fed.

The sub-hopper 1602 is replenished with toner from the toner bottle 1600 at a timing when toner has decreased to a certain extent. Therefore, the sub-hopper 1602 is not always full of toner. Therefore, the image forming apparatus 250 makes use of an empty space in the sub-hopper 1602.

The image forming apparatus 250 empties the toner bottle 1600 by the timing of delivery, by transferring a small amount of toner remaining in the toner bottle 1600, to the sub-hopper 1602. Thus, the toner bottle 1600 can be replaced at the timing of delivery. Furthermore, there is no disadvantage for the user, because the toner is merely transferred to the sub-hopper 1602, rather than being used.

In one example, it is assumed that 15 g of Y toner remains in the Y toner bottle 1600 of the image forming apparatus 250. Usually, the timing to replace the toner bottle 1600 is the timing at which the remaining amount of toner in the toner bottle 1600 has decreased to about 5 g. Therefore, if the timing of delivery is reached in this state, the user cannot replace the toner bottle 1600 at the timing of delivery.

In this case, it is necessary to ensure a space to place a new toner bottle 1600 that could not replace the current bottle, which imposes a burden on the user. Furthermore, if the toner bottle 1600 of the image forming apparatus 250 is forced to be replaced at the timing of delivery, 10 g of toner (15 g−5 g=10 g) is wasted. Therefore, it is desirable for the image forming apparatus 250 to transfer 10 g of toner from the toner bottle 1600 to the sub-hopper 1602 by the timing of delivery.

The delivery management apparatus 200 determines whether or not a certain amount of toner as described above can be transferred from the toner bottle 1600 to the sub-hopper 1602. For this purpose, the delivery management apparatus 200 receives, from the image forming apparatus 250, information on the consumption state of the consumable including the remaining amount of toner in the sub-hopper 1602.

It is assumed that the sub-hopper 1602 has a space to further accommodate 30 g of toner. In this case, the delivery management apparatus 200 generates an adjustment setting for the amount of toner to be transferred, so that a certain amount of toner as described above can be transferred from the toner bottle 1600 to the sub-hopper 1602. The image forming apparatus 250 performs a process based on the adjustment setting for the amount of toner to be transferred, to preventing the toner bottle 1600 from being unreplaceable at the timing of delivery.

Next, a description will be given of a process in which, in the case where the sub-hopper 1602 is full, toner is transferred from the sub-hopper 1602 to the developer bearing member 306 to make room in the sub-hopper 1602, and then toner is transferred from the toner bottle 1600 to the sub-hopper 1602. This process enables the user to replace the toner bottle 1600 at the timing of delivery.

In one example, it is assumed that 40 g of Y toner remains in the Y toner bottle 1600 of the image forming apparatus 250. Usually, the timing to replace the toner bottle 1600 is the timing at which the remaining amount of toner in the toner bottle 1600 has decreased to about 5 g. Therefore, if the timing of delivery is reached in this state, the user cannot replace the toner bottle 1600 at the timing of delivery.

In this case, it is necessary for the user of the image forming apparatus 250 to ensure a space to place a new toner bottle 1600 that could not replace the current bottle, which imposes a burden on the user. Furthermore, if the toner bottle 1600 of the image forming apparatus 250 is forced to be replaced at the timing of delivery, 35 g of toner (40 g−5 g=35 g) is wasted. Therefore, it is desirable for the image forming apparatus 250 to transfer 35 g of toner from the toner bottle 1600 to the sub-hopper 1602 by the timing of delivery.

The delivery management apparatus 200 determines whether or not a certain amount of toner as described above can be transferred from the toner bottle 1600 to the sub-hopper 1602. For this purpose, the delivery management apparatus 200 receives, from the image forming apparatus 250, information on the consumption state of the consumable including the remaining amount of toner in the sub-hopper 1602. In this example, it is assumed that the sub-hopper 1602 has only the space to further accommodate 30 g of toner. That is, even when 30 g of toner is transferred to the sub-hopper 1602, 10 g of toner still remains in the toner bottle 1600.

Therefore, the image forming apparatus 250 transfers 5 g of toner from the sub-hopper 1602 to the developer bearing member 306 to generate, in the sub-hopper 1602, an empty space to accommodate 5 g of toner. Thus, the image forming apparatus 250 can transfer 35 g of toner from the toner bottle 1600 to the sub-hopper 1602. As a result, the toner in the toner bottle 1600 becomes less than or equal to the 5 g (threshold value 602) at the timing of delivery. Then, the user can replace the toner bottle 1600 at the timing of delivery.

FIG. 17 is a diagram illustrating an example of the toner concentration of the developer bearing member 306. At a timing when the sub-hopper 1602 becomes empty to a certain extent, the toner bottle 1600 is rotated so that toner in the bottle is fed all together into the sub-hopper 1602. However, since the toner/carrier ratio is determined for the toner in the developer bearing member 306, toner is supplied little by little from the sub-hopper 1602 to the developer bearing member 306 to conform to the ratio.

A table 1700 indicates a default value, an upper limit value, and a lower limit value of the toner concentration in the developer bearing member 306 for each color. In one example, the Y toner concentration 1702 and the C toner concentration 1706 each have a default value of 7%. In another example, the M toner concentration 1704 and the K toner concentration 1708 each have a default value of 6.5%.

With reference to the table 1700, a description will be given of a process to be performed in the case where the sub-hopper 1602 is full and the toner concentration in the developer bearing member 306 has not reached the upper limit. In this case, the image forming apparatus 250 can discharge toner from the sub-hopper 1602 to the developer bearing member 306 until the toner concentration in the developer bearing member 306 reaches the upper limit. As a result, the capacity of the sub-hopper 1602 can be increased, so that the image forming apparatus 250 can transfer a larger amount of toner from the toner bottle 1600 to the sub-hopper 1602.

As described above, the delivery management apparatus 200 generates an adjustment setting for the amount of toner to be transferred, so that the image forming apparatus 250 can transfer a certain amount of toner from the toner bottle 1600 to the sub-hopper 1602 and from the sub-hopper 1602 to the developer bearing member 306. The image forming apparatus 250 performs the process based on the adjustment setting for the amount of toner to be transferred. The user is therefore prevented from being unable to replace the toner bottle 1600 at the timing of delivery.

Thus, it is unnecessary to ensure a place to store consumables, and consumables can be delivered all together at the same timing of delivery, without imposing a burden on the user. The process described with reference to FIGS. 16 and 17 may be performed separately for each color toner. Furthermore, the adjustment setting for the amount of toner to be transferred can be generated for each color toner.

As described above, the image forming apparatus 250 discharges toner from the toner bottle 1600 to the sub-hopper 1602 based on the received adjustment setting, so that the toner bottle 1600 can be emptied and replaced at the same timing of delivery.

As described above, when the sub-hopper 1602 is full of toner, the image forming apparatus 250 discharges, based on the received adjustment setting, the toner from the sub-hopper 1602 to the developer bearing member 306 and discharges toner from the toner bottle 1600 to the sub-hopper 1602, so that the toner bottle 1600 can be emptied and replaced at the same timing of delivery.

E. Modifications

Figure 18:
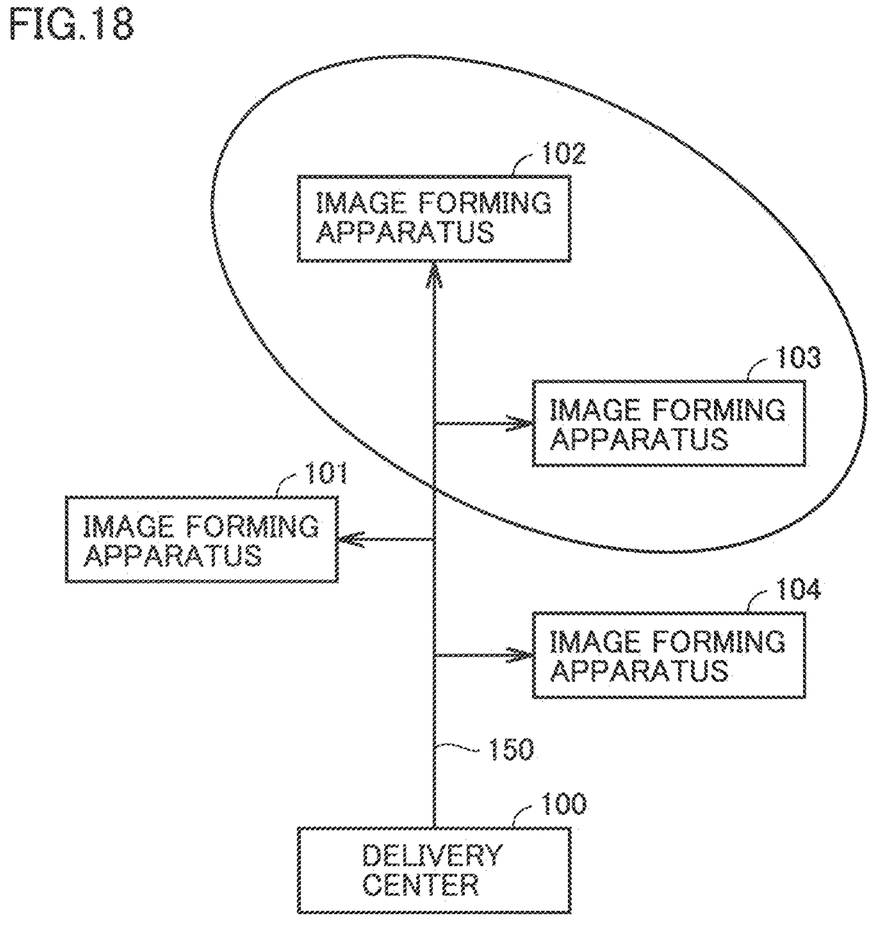
FIG. 18 is a diagram illustrating an example of a process in a case where a user is different for every some of image forming apparatuses.

FIG. 18 is a diagram illustrating an example of a process in a case where a user is different for every some of image forming apparatuses. According to the delivery method 170, when consumables are to be delivered to the image forming apparatuses 101, 102, 103, and 104, the delivery center 100 delivers the consumables all together at the same timing of delivery 150.

In a certain aspect, a single user may have a plurality of image forming apparatuses. In one example, the same user may use the image forming apparatus 102 and the image forming apparatus 103.

In a certain aspect, the delivery management apparatus 200 may manage delivery destinations of consumables for a plurality of image forming apparatuses owned by the same user, as one destination. The delivery management apparatus 200 also includes an output unit or output device (not illustrated) that outputs respective addresses of delivery destinations and a list of consumables to be delivered to each address. A staff member of the delivery center 100 can deliver consumables to each user based on the destination output by the delivery management apparatus 200.

In a certain aspect, each of a plurality of image forming apparatuses 250 can display information on adjustment setting on an operation panel. Furthermore, each of a plurality of image forming apparatuses 250 is configured to be able to select, via the operation panel, whether to perform adjustment setting. Thus, the user can select, by himself/herself, which of the print quality and prevention of shortage of consumables should be given priority.

As described above, the user is different for every some of one or more image forming apparatuses.

As described above, the image forming apparatus 250 is configured to be able to select, on the panel of the image forming apparatus 250, whether to perform adjustment setting.

F. System Process Procedure

Next, a process procedure of the delivery management system 20 will be described with reference to FIGS. 19 to 23. In practice, the image forming apparatus 250 and the delivery management apparatus 200 perform the following process. The processor 412 of the image forming apparatus 250 may read a program for performing some processes of FIGS. 19 to 23 from the storage 416 into the RAM 414 and execute the program.

Similarly, the processor 501 of the delivery management apparatus 200 may read a program for performing some processes of FIGS. 19 to 23 from the storage 503 into the RAM 502 and execute the program. In another aspect, some or all of the processes may be implemented in the form of a combination of circuit elements configured to perform the processes.

FIG. 19 is a flowchart illustrating an example of the entire process procedure. In step S1910, each image forming apparatus 250 calculates or predicts the consumption state of a consumable. This process corresponds to process in which the image forming apparatus 250A and the image forming apparatus 250B in FIG. 2 calculate or predict the consumption states of the consumables of respective image forming apparatuses 250, and generate information on the consumption states of the consumables.

Here, the information on the consumption state of the consumable includes the remaining amount of toner in the toner bottle 1600, the remaining amount of toner in the sub-hopper 1602, and the remaining amount of toner in the developer bearing member 306, for example. The consumption states of consumables include the number of rotations of the image bearing member 304, the remaining film thickness of the image bearing member 304, the number of rotations of the developer bearing member 306, and the driven distance of the intermediate transfer member 308, for example. Furthermore, the consumption state of the consumable may include the number of printed sheets. The consumption state of each consumable may also include a past consumption state, and a predicted progress of consumption of a consumable obtained from the past consumption state, and the like.

In step S1920, each image forming apparatus 250 transmits the acquired information on the consumption state of the consumable to the delivery management apparatus 200. This process corresponds to a process in which the communicator 260 of each image forming apparatus 250 in FIG. 2 transmits the information on the consumption state of the consumable of each image forming apparatus 250 to the acquirer 202 of the delivery management apparatus 200.

In step S1930, the delivery management apparatus 200 receives the information on the consumption state of the consumable received from each image forming apparatus 250. This process corresponds to the process in which the acquirer 202 of the delivery management apparatus 200 acquires the information on the consumption state of the consumable, from the communicator 260 of each image forming apparatus 250 in FIG. 2.

In step S1940, the delivery management apparatus 200 determines the same timing of delivery of consumables to all the image forming apparatuses 250, based on the acquired consumption states of the consumables of the image forming apparatuses 250. This process corresponds to the process in which the timing determiner 204 in FIG. 2 determines the timing of delivery common to all the image forming apparatuses 250, based on the consumption state of the consumable of each image forming apparatus 250. A main example of the consumption state of the consumable is the one described above with reference to the table 600 of FIG. 6.

In step S1950, the delivery management apparatus 200 generates an adjustment setting for the consumption amount of the consumable of each image forming apparatus 250, based on the acquired consumption state of the consumable of each image forming apparatus 250 and the determined timing of delivery. The process of this step corresponds to the process of generating the adjustment setting for the consumption amount for each image forming apparatus 250 in FIG. 2. The details of step S1950 will be described with reference to FIG. 20.

In step S1960, the delivery management apparatus 200 transmits each determined adjustment setting to the respective one of the image forming apparatuses 250. This process corresponds to the process in which the transmitter 208 of the delivery management apparatus 200 transmits, to the communicator 260 of each image forming apparatus 250, the adjustment setting suitable for the consumption state of the consumable of the image forming apparatus 250 in FIG. 2.

In step S1970, each image forming apparatus 250 receives the adjustment setting from the delivery management apparatus 200. This process corresponds to the process in which the communicator 260 of each image forming apparatus 250 receives the adjustment setting for the consumption amount of the consumable, from the transmitter 208 of the delivery management apparatus 200 in FIG. 2.

In step S1980, each image forming apparatus 250 performs the process based on the adjustment setting received in step S1970. This process corresponds to the process in which the controller 270 of each image forming apparatus 250 performs the process based on the adjustment setting received from the communicator 260 in FIG. 2.

FIG. 20 is a flowchart illustrating an example of a process procedure in which the delivery management apparatus 200 generates an adjustment setting for the consumption amount of a consumable. The flow of FIG. 20 is performed as a subroutine of step S1950 of FIG. 19.

In step S2010, the delivery management apparatus 200 generates an adjustment setting to reduce the consumption amount of toner of the image forming apparatus 250. When the delivery management apparatus 200 generates the adjustment setting for the consumption amount of the consumable, the delivery management apparatus 200 determines whether a shortage of toner in the toner bottle 1600 will occur by the timing of delivery.

The process of step S2010 corresponds to the process described above with reference to FIG. 7. It is assumed that the delivery management apparatus 200 determines that a shortage of toner in the toner bottle 1600 will occur by the timing of delivery. In this case, the delivery management apparatus 200 generates an adjustment setting for reducing consumption of the toner, and then makes the control proceed to step S2020. Otherwise, the delivery management apparatus 200 makes the control proceed to step S2020.

The adjustment setting for preventing shortage of toner includes, for example, the adjustment settings illustrated in FIGS. 10 to 14. More specifically, the adjustment setting for reducing the toner consumption amount includes a setting for increasing the fog margin, a setting for replacing the K toner with the Y toner, the M toner, and the C toner, a setting for reducing the amount of toner adhered to a medium, and a setting for reducing the number of times of density adjustment is made through image stabilization. In a certain aspect, the delivery management apparatus 200 may incorporate one, a combination of some, or all of these settings in the adjustment setting.

In step S2020, the delivery management apparatus 200 generates an adjustment setting for reducing the consumption amount of the image bearing member 304, the developer bearing member 306, and the intermediate transfer member 308. Next, the delivery management apparatus 200 determines whether a shortage of the image bearing member 304, the developer bearing member 306, and the intermediate transfer member 308 will occur by the timing of delivery.

The process of step S2020 corresponds to the process described above with reference to FIG. 8. It is assumed that the delivery management apparatus 200 determines that a shortage of the image bearing member 304, the developer bearing member 306, and the intermediate transfer member 308 will occur by the timing of delivery. In this case, the delivery management apparatus 200 generates an adjustment setting for reducing the consumption of the image bearing member 304, the developer bearing member 306, and the intermediate transfer member 308, and then makes the control proceed to step S2030. Otherwise, the delivery management apparatus 200 makes the control proceed to step S2030.

The adjustment setting for preventing shortage of the image bearing member 304, the developer bearing member 306, and the intermediate transfer member 308 includes, for example, the adjustment settings illustrated in FIGS. 14 and 15. More specifically, the adjustment setting for reducing the consumption amount of the image bearing member 304, the developer bearing member 306, and the intermediate transfer member 308 includes a setting for reducing the number of times the density adjustment is made through image stabilization and a setting for reducing the number of times of the charging voltage adjustment is made for the image bearing member 304. In a certain aspect, the delivery management apparatus 200 may incorporate one, a combination of some, or all of these settings in the adjustment setting.

In step S2030, the delivery management apparatus 200 generates an adjustment setting for emptying the toner bottle 1600 of the image forming apparatus 250. Next, the delivery management apparatus 200 determines whether toner will remain in the toner bottle 1600 at the timing of delivery.

The process of step S2030 corresponds to the process described above with reference to FIG. 9. It is assumed that the delivery management apparatus 200 determines that toner will remain in the toner bottle 1600 at the timing of delivery. In this case, the delivery management apparatus 200 generates an adjustment setting for transferring toner in the toner bottle 1600 to the sub-hopper 1602, and then ends the control. Otherwise, the delivery management apparatus 200 ends the control.

The adjustment setting for preventing a small amount of toner from remaining in the toner bottle 1600 even when the timing of delivery arrives includes, for example, the adjustment settings illustrated in FIGS. 16 and 17. More specifically, the adjustment setting for preventing toner from remaining in the toner bottle 1600 even when the timing of delivery arrives includes a setting for transferring toner in the toner bottle 1600 to the sub-hopper 1602, a setting for transferring toner in the sub-hopper 1602 to the developer bearing member 306 and then transferring toner in the toner bottle 1600 to the sub-hopper 1602, and the like. In a certain aspect, the delivery management apparatus 200 may incorporate one, a combination of some, or all of these settings in the adjustment setting.

Figure 21:
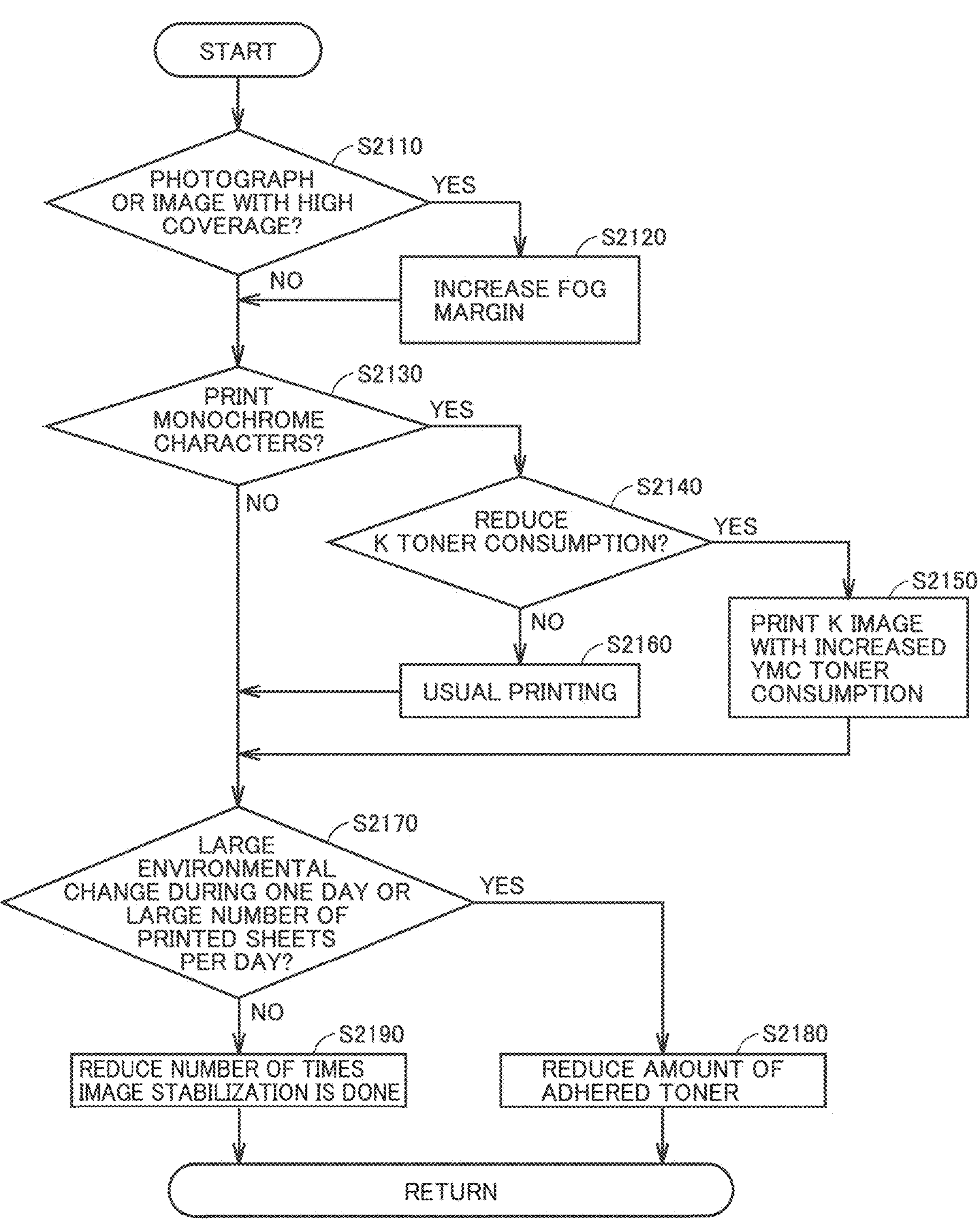
FIG. 21 is a flowchart illustrating an example of a process procedure for reducing a consumption amount of toner.

FIG. 21 is a flowchart illustrating an example of a process procedure for reducing the toner consumption amount. The flow of FIG. 21 is performed as a subroutine of step S2010 of FIG. 20.

In step S2110, the delivery management apparatus 200 determines whether to print a photograph or an image with a high coverage. When determining that a photograph or an image with a high coverage is to be printed (YES in step S2110), the delivery management apparatus 200 makes the control proceed to step S2120. Otherwise (NO in step S2110), the delivery management apparatus 200 makes the control proceed to step S2130. In step S2120, the delivery management apparatus 200 generates an adjustment setting to increase the fog margin. Alternatively, the delivery management apparatus 200 adds a setting for increasing the fog margin to the adjustment setting.

In step S2130, the delivery management apparatus 200 determines whether to print monochrome characters. When determining that monochrome characters are to be printed (YES in step S2130), the delivery management apparatus 200 makes the control proceed to step S2140. Otherwise (NO in step S2130), the delivery management apparatus 200 makes the control proceed to step S2170.

In step S2140, the delivery management apparatus 200 determines whether to reduce consumption of K toner. In the case where it is determined that the consumption of K toner is to be reduced (YES in step S2140), the delivery management apparatus 200 makes the control proceed to step S2150. Otherwise (NO in step S2140), the delivery management apparatus 200 makes the control proceed to step S2160.

In step S2150, the delivery management apparatus 200 generates an adjustment setting for replacing K toner for printing with Y toner, M toner, and C toner. Alternatively, the delivery management apparatus 200 adds, to the adjustment setting, a setting for replacing K toner for printing with Y toner, M toner, and C toner. In step S2160, the delivery management apparatus 200 generates a setting for performing usual printing. Alternatively, the delivery management apparatus 200 adds a setting for performing usual printing to the adjustment setting.

In step S2170, the delivery management apparatus 200 determines, for the image forming apparatus 250, whether a large environmental change occurs during one day or whether the number of printed sheets per day is large. When the delivery management apparatus 200 determines that the large environmental change occurs during one day or that the number of printed sheets per day is large (YES in step S2170), the delivery management apparatus 200 makes the control proceed to step S2180. Otherwise (NO in step S2170), the delivery management apparatus 200 makes the control proceed to step S2190.

In step S2180, the delivery management apparatus 200 generates an adjustment setting for reducing the amount of adhered toner. Alternatively, the delivery management apparatus 200 adds a setting to reduce the amount of adhered toner, to the adjustment setting. In step S2190, the delivery management apparatus 200 generates an adjustment setting for reducing the number of times image stabilization is done. The delivery management apparatus 200 adds, to the adjustment setting, a setting for reducing the number of times image stabilization is done.

Figure 22:
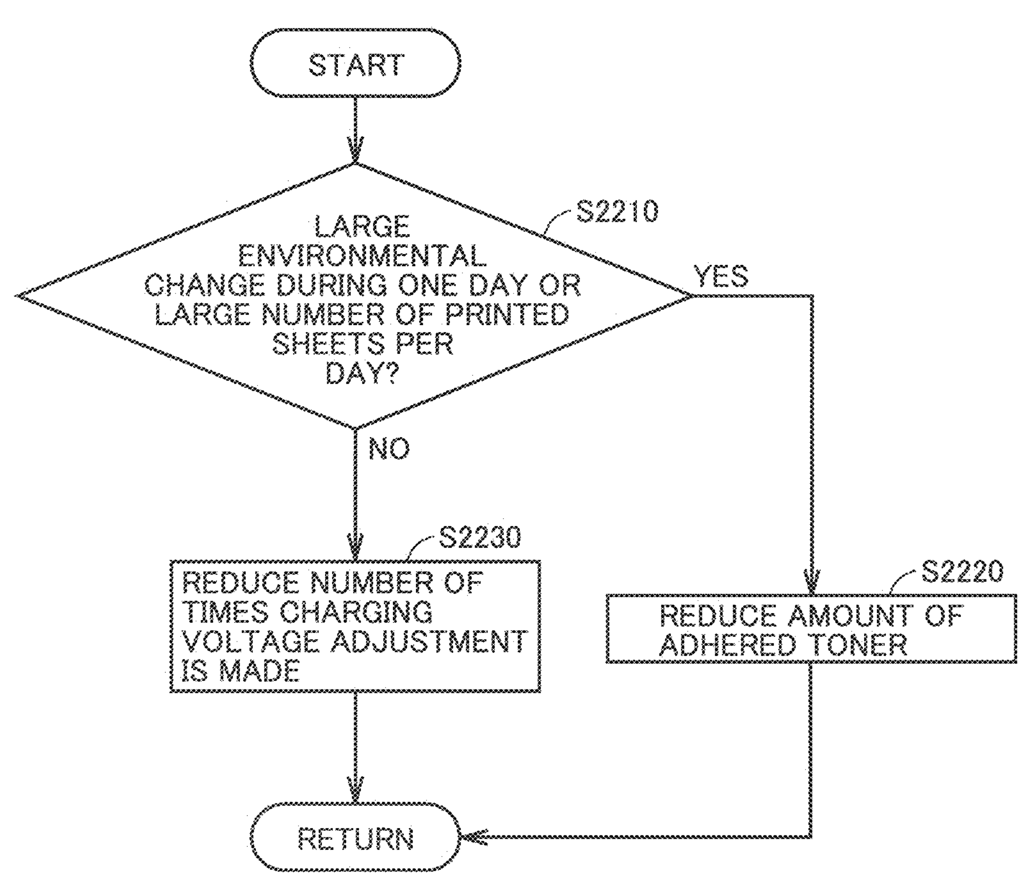
FIG. 22 is a flowchart illustrating an example of a process procedure for reducing respective consumption amounts of an image bearing member, a developer bearing member, and an intermediate transfer member.

FIG. 22 is a flowchart illustrating an example of a process procedure for reducing respective consumption amounts of the image bearing member 304, the developer bearing member 306, and the intermediate transfer member 308. The flow of FIG. 22 is performed as a subroutine of step S2020 of FIG. 20.

In step S2210, the delivery management apparatus 200 determines, for the image forming apparatus 250, whether a large environmental change occurs during one day or whether the number of printed sheets per day is large. When the delivery management apparatus 200 determines that the large environmental change occurs during one day or that the number of printed sheets per day is large (YES in step S2210), the delivery management apparatus 200 makes the control proceed to step S2220. Otherwise (NO in step S2210), the delivery management apparatus 200 makes the control proceed to step S2230. In a certain aspect, the delivery management apparatus 200 may perform the process of this step by using a predetermined threshold value for each of the environmental change and the number of printed sheets. The process of step S2220 is the same as the process of step S2180.

In step S2230, the delivery management apparatus 200 generates an adjustment setting for reducing the number of times the charging voltage adjustment is made. Alternatively, the delivery management apparatus 200 adds a setting for reducing the number of times of charging voltage adjustment is made, to the adjustment setting. In a certain aspect, in step S2230, the delivery management apparatus 200 may generate an adjustment setting for reducing the number of times image stabilization is done. Alternatively, the delivery management apparatus 200 may add, to the adjustment setting, an adjustment setting for reducing the number of times image stabilization is done. Furthermore, in another aspect, the delivery management apparatus 200 may generate an adjustment setting to reduce the number of times the charging voltage adjustment is made and reduce the number of times of image stabilization is done. Alternatively, the delivery management apparatus 200 may add, to the adjustment setting, a setting to reduce the number of times the charging voltage adjustment is made and a setting to reduce the number of times image stabilization is done.

Figure 23:
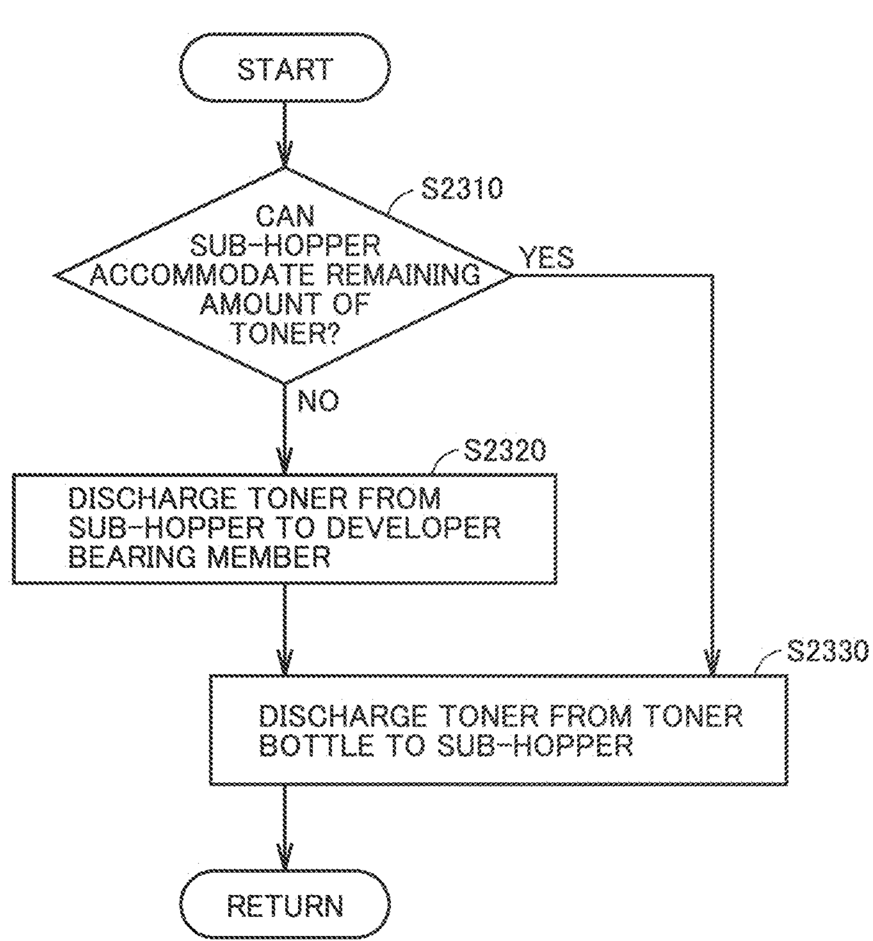
FIG. 23 is a flowchart illustrating an example of a process procedure for emptying a toner bottle.

FIG. 23 is a flowchart illustrating an example of a process procedure for emptying the toner bottle 1600. The flow of FIG. 23 is performed as a subroutine of step S2030 of FIG. 20.

In step S2310, the delivery management apparatus 200 determines whether or not the remaining amount of toner in the toner bottle 1600 can be accommodated in the sub-hopper. When determining that the remaining amount of toner in the toner bottle 1600 can be accommodated in the sub-hopper (YES in step S2310), the delivery management apparatus 200 makes the control proceed to step S2330. Otherwise (NO in step S2310), the delivery management apparatus 200 makes the control proceed to step S2320.

In step S2320, the delivery management apparatus 200 generates an adjustment setting for discharging toner from the sub-hopper to the developer bearing member 306. In step S2330, the delivery management apparatus 200 generates an adjustment setting for discharging toner from the toner bottle 1600 to the sub-hopper.

G. Summary

As described above, each of one or more image forming apparatuses 250 transmits information on the consumption state of one or more consumables to the delivery management apparatus 200. The delivery management apparatus 200 determines the same timing of delivery of one or more consumables to one or more image forming apparatuses 250, based on the received information on the consumption state of one or more consumables. In addition, the delivery management apparatus 200 generates an adjustment setting for the consumption amount of one or more consumables, for each of one or more image forming apparatuses, based on the same timing of delivery. Furthermore, the delivery management apparatus 200 transmits the adjustment setting for each of one or more image forming apparatuses 250, to each of a plurality of image forming apparatuses 250.

Based on the received adjustment setting, each of one or more image forming apparatuses 250 performs the adjustment setting received from the delivery management apparatus. Thus, the delivery management system 20 can prevent shortage of consumables while reducing the delivery cost.

Although embodiments of the present invention have been described and illustrated in detail, the disclosed embodiments are made for purposes of illustration and example only and not limitation. The scope of the present invention should be interpreted by terms of the appended claims.

What is claimed is:

1. A delivery management system comprising:
image forming apparatuses; and
a delivery management apparatus,
the delivery management apparatus including:
a processor that:
acquires information on a consumption state of consumables used in each of the image forming apparatuses,
determines a same timing of delivery of the consumables to the image forming apparatuses, based on the information on the consumption state of the consumables,
generates an adjustment setting for a consumption amount of the consumables, for each of the image forming apparatuses, based on the same timing of delivery, and
transmits, to each of the image forming apparatus, the adjustment setting for each of the image forming apparatuses,
each of the image forming apparatuses including:
a communication interface that transmits the information on the consumption state of the consumables to the delivery management apparatus, and receives the adjustment setting; and
a controller that executes at least one of:
changing the consumption amount of toner as the consumables by changing a fog margin in each of the image forming apparatuses, based on the received adjustment setting; and
changing the consumption amount of black toner as the consumables by increasing the consumption amount of toner of other colors for image formation other than the black toner, based on the received adjustment setting.

2. The delivery management system according to claim 1, wherein the image forming apparatuses are operated by different users from one another.

3. The delivery management system according to claim 1, wherein every predetermined number of the image forming apparatuses are operated by different users from one another.

4. A delivery management apparatus comprising:

a processor that:

acquires information on a consumption state of consumables used in each of image forming apparatuses that executes at least one of:

changing a consumption amount of toner as the consumables by changing a fog margin in each of the image forming apparatuses, based on a received adjustment setting; and changing a consumption amount of black toner as the consumables by increasing the consumption amount of toner of other colors for image formation other than the black toner, based on the received adjustment setting, determines a same timing of delivery of the consumables to the image forming apparatuses, based on the information on the consumption state of the consumables, generates an adjustment setting for the consumption amount of the consumables, for each of the image forming apparatuses, based on the same timing of delivery, and transmits, to each of the image forming apparatuses, the adjustment setting for each of the image forming apparatuses.

5. An image forming apparatus comprising:

a communication interface that communicates with a delivery management apparatus; and a controller that adjusts a usage amount of consumables, wherein the communication interface:

transmits information on a consumption state of the consumables to the delivery management apparatus, and receives, from the delivery management apparatus, an adjustment setting for a consumption amount of the consumables determined based on a same timing of delivery among the image forming apparatus and one or more other image forming apparatuses, and the controller executes at least one of:

changing the consumption amount of toner as the consumables by changing a fog margin in the image forming apparatus, based on the received adjustment setting; and changing the consumption amount of black toner as the consumables by increasing the consumption amount of toner of other colors for image formation other than the black toner, based on the received adjustment setting.

6. The image forming apparatus according to claim 5, wherein the consumables include a toner bottle, an image bearing member, a developer bearing member, and an intermediate transfer member.

7. The image forming apparatus according to claim 6, wherein the image forming apparatus predicts the consumption state of the consumables, from at least one of the consumption amount of toner for print information, a remaining amount of toner in the toner bottle, a number of printed sheets, a number of rotations of the image bearing member, a remaining film thickness of the image bearing member, a number of rotations of the developer bearing member, and a driven distance of the intermediate transfer member.

8. The image forming apparatus according to claim 5, wherein the image forming apparatus changes the consumption amount of toner by decreasing a density of a print image to change an amount of toner adhered to a medium, based on the received adjustment setting.

9. The image forming apparatus according to claim 6, wherein the image forming apparatus changes the consumption amount of toner, the image bearing member, the developer bearing member, and the intermediate transfer member, by changing a number of times density adjustment is made by image stabilization, based on the received adjustment setting.

10. The image forming apparatus according to claim 6, wherein the image forming apparatus changes the consumption amount of the image bearing member, the developer bearing member, and the intermediate transfer member, by changing a number of times charging voltage adjustment is made for the image bearing member, based on the received adjustment setting.

11. The image forming apparatus according to claim 6, wherein the image forming apparatus discharges toner from the toner bottle to a sub-hopper to empty the toner bottle and make the toner bottle replaceable at the same timing of delivery, based on the received adjustment setting.

12. The image forming apparatus according to claim 6, wherein when a sub-hopper is full of toner, the image forming apparatus discharges the toner from the sub-hopper to the developer bearing member and discharges toner from the toner bottle to the sub-hopper, to empty the toner bottle and make the toner bottle replaceable at the same timing of delivery, based on the received adjustment setting.

13. The image forming apparatus according to claim 6, wherein the image forming apparatus enables selection, on a panel of the image forming apparatus, as to whether to perform the adjustment setting.

* * * * *